US008117013B2

(12) United States Patent
Wilson et al.

(10) Patent No.: US 8,117,013 B2
(45) Date of Patent: Feb. 14, 2012

(54) APPARATUS, METHOD AND PROGRAM STORAGE DEVICE FOR DETERMINING HIGH-ENERGY NEUTRON/ION TRANSPORT TO A TARGET OF INTEREST

(75) Inventors: John W. Wilson, Newport News, VA (US); Ram K. Tripathi, Hampton, VA (US); Francis F. Badavi, Suffolk, VA (US); Francis A. Cucinotta, League City, TX (US)

(73) Assignee: The United States of America as represented by the Adminstrator of the National Aeronautics and Space Administration, Washington, DC (US)

( * ) Notice: Subject to any disclaimer, the term of this patent is extended or adjusted under 35 U.S.C. 154(b) by 937 days.

(21) Appl. No.: 12/002,857

(22) Filed: Dec. 11, 2007

(65) Prior Publication Data

US 2008/0249753 A1 Oct. 9, 2008

Related U.S. Application Data

(60) Provisional application No. 60/877,012, filed on Dec. 11, 2006.

(51) Int. Cl.
*G06F 17/50* (2006.01)

(52) U.S. Cl. .......................................................... 703/2

(58) Field of Classification Search ....................... 703/2
See application file for complete search history.

(56) References Cited

U.S. PATENT DOCUMENTS 5,870,697 A 2/1999 Chandler et al.
2005/0143965 A1 6/2005 Failla et al.
2005/0192764 A1 9/2005 Holland

OTHER PUBLICATIONS

Blattnig et al.; MESTRN: A Deterministic Meson-Muon Transport Code for Space Radiation; Aug. 2004, NASA/TM-2004-212995; pp. 1-159.*

Wilson et al.; HZETRN: Description of a Free-Space Ion and Nucleon Transport and Shielding Computer Program; NASA Technical Paper 3495; May 1995; pp. 1-117.*

J. W. Wilson et al., "Standardized Radiation Shield Design Method: 2005 HZETRN," SAE International, 06ICES-18, 2006 conference, pp. 1-14.

J. Tweed et al., "Computational methods for the HZETRN code", Elsevier—Advances in Space Research 35, Mar. 1, 2005, p. 194-201, (Norfolk).

Nealy, J.E., Cucinotta, F.A., Wilson, J.W., Basavi, F.F., Zapp, N., Semones, E., Walker, S.A., De Angelis, G., Pre-engineering spaceflight validation of environmental models and the 2005 HZETRN simulation code., 36th COSPAR Scientific Assembly, Jul. 23, 2004, p. 1399 (Beijing), (2007).

* cited by examiner

*Primary Examiner* — Hugh Jones

(74) *Attorney, Agent, or Firm* — Andrea Z. Warmbier; Linda B. Blackburn

(57) ABSTRACT

An apparatus, method and program storage device for determining high-energy neutron/ion transport to a target of interest. Boundaries are defined for calculation of a high-energy neutron/ion transport to a target of interest; the high-energy neutron/ion transport to the target of interest is calculated using numerical procedures selected to reduce local truncation error by including higher order terms and to allow absolute control of propagated error by ensuring truncation error is third order in step size, and using scaling procedures for flux coupling terms modified to improve computed results by adding a scaling factor to terms describing production of j-particles from collisions of k-particles; and the calculated high-energy neutron/ion transport is provided to modeling modules to control an effective radiation dose at the target of interest.

18 Claims, 14 Drawing Sheets

(a) Aluminum shield on water.
20 g/cm$^2$ A 1; 30 g/cm$^2$ water (b) Iron shield on water.
20 g/cm$^2$ Fe; 30 g/cm$^2$ water

APPARATUS, METHOD AND PROGRAM STORAGE DEVICE FOR DETERMINING HIGH-ENERGY NEUTRON/ION TRANSPORT TO A TARGET OF INTEREST

Pursuant to 35 U.S.C. §119, the benefit of priority from provisional application 60/877,012, with a filing date of Dec. 11, 2006, is claimed for this non-provisional application.

ORIGIN OF THE INVENTION

The invention described herein was made by employees of the United States Government and may be manufactured and used by or for the Government for Government purposes without payment of any royalties thereon or therefore.

BACKGROUND OF THE INVENTION

1. Field of the Invention

This invention relates in general to radiation shield designs, and more particularly to an apparatus, method and program storage device for calculating high-energy neutron/ion transport to a target of interest.

2. Description of the Related Art

The capability to make diagnostic assessments of radiation exposure is needed to support a wide range of radiation exposure events. Moreover, the question of risk from radiation exposure is a much-debated topic of discussion. Every person receives daily "background" radiation from a variety of natural sources: from cosmic rays and radioactive materials in the Earth, from naturally occurring radionuclides in food, and from inhaling particulate decay products of radon gas. One area of increased radiation exposure risk to human results from advancing aircraft technology that allows higher operating altitudes thereby reducing the protective cover provided by the Earth's atmosphere from extraterrestrial radiations. This increase in operating altitudes is taken to a limit by human operations in space. Space radiation is likely to be the ultimate limiting factor for future human deep space exploration. Understanding the space radiation environment is essential for risk assessment of orbit/crew selection and provides the scientific basis of countermeasures for shielding materials (affecting flight weight/cost), radio-protectants, and pharmaceuticals. Every tissue/material/part installed on a space mission requires radiation risk analysis. While the present invention is described here with reference to spacecraft, those skilled in the art will recognize that the principles discussed herein and the embodiments of the invention described herein are also applicable to other applications and industries, such as aircraft design, material development, and proton cancer therapy.

The propagation of galactic ions through extended matter and determination of the origin of these ions has been the subject of many studies. For example, a one-dimensional equilibrium solution was proposed early to show that the light ions have their origin in the breakup of heavy particles. However, the one dimensional equilibrium solution did not include ionization energy loss and radioactive decay. Later, the one-dimensional propagation was shown to be simplistic and that leakage at the galactic boundary must be taken into account. The leakage was found to be approximated as a superposition of nonequilibrium one-dimensional solutions. A solution to the steady-state equations was given as a Volterra equation, which was solved to the first order in the fragmentation cross sections by ignoring energy loss. This provided an approximation of the first-order solution that included ionization energy loss and was only valid at relativistic energies. An overview of the cosmic ray propagation was later provided. A derivation of the Volterra equation included the ionization energy loss, but evaluated only the unperturbed term.

These studies focused on only achieving first-order solutions in the fragmentation cross sections where path lengths in the interstellar space are approximately 3 to 4 g/cm$^2$. However, higher order terms cannot be ignored in accelerator or space shielding transport problems. In addition to this simplification, previous cosmic ray models have neglected the complicated three-dimensional nature of the fragmentation process.

Several approaches to the solution of high-energy heavy ion propagation that include ionization energy loss have been developed during the last 20 years. However, most have assumed the straight-ahead approximation and velocity-conserving fragmentation interactions, whereas only a few have incorporated energy-dependent cross sections. An approach examining a primary ion beam represented the first-generation secondary fragments as a quadrature over the collision density of the primary beam. An energy multigroup method was used in which an energy-independent fragmentation transport approximation was applied within each energy group after which the energy group boundaries were moved according to continuous slowing-down theory. The energy-independent fragment transport equation was solved with primary collision density as a source and neglected higher order fragmentation. The primary source term extended only to the primary ion range from the boundary and the energy-independent transport solution was modified to account for the finite range of the secondary fragment ions.

An expression was derived for the ion transport problem to the first-order (i.e., first-collision) term and gave an analytical solution for the depth-dose relationship. The more common approximations used in solving the heavy ion transport problem were further examined. The effect of conservation of velocity on fragmentation and on the straight-ahead approximation was found to be negligible for cosmic ray applications. Solution methods for representation of the energy-dependent nuclear cross sections were derived. The energy loss term and the ion spectra were approximated by simple forms for which energy derivatives were evaluated explicitly. The resulting ordinary differential equations in terms of position were solved analytically. This approximation results in the decoupling of motion in space and a change in energy. The energy shifts were replaced by an effective attenuation factor. Later, the next higher order (i.e., second-collision) term was added. The second-collision term was found to be very important in describing 20 Ne beams at 670 A MeV. The three-term expansion was modified to include the effect of energy variation of the nuclear cross sections. The integral form of the transport equation was also used to derive a numerical marching procedure to solve the cosmic ray transport problem. This method accommodated the energy-dependent nuclear cross sections within the numerical procedure. Comparison of the numerical procedure with an analytical solution of a simplified problem validated the solution technique to approximately 1-percent accuracy. Several solution techniques and analytical methods have also been developed for testing future numerical solutions of the transport equation. More recently, an analytical solution for the laboratory ion beam transport problem has been derived with a straight-ahead approximation, velocity conservation at the interaction site, and energy-dependent nuclear cross sections.

From an overview of these past developments, the applications are divided into two categories: a single-ion species with a single energy at the boundary and a broad host of elemental types with a broad continuous energy spectrum. Techniques, which will represent the spectrum over an array of energy values, require vast computer storage and computation speed to maintain sufficient energy resolution for the laboratory beam problem. In contrast, analytical methods, which are applied as a marching procedure have similar energy resolution problems. This is a serious limitation because a final (i.e., production) high-charge-and-energy (HZE) computation method for cosmic ray shielding must be thoroughly validated by laboratory experiments. Some researchers hope for a single code, which can be validated in the laboratory and used in space applications. More recently, a Green's function has been derived which can be tested in the laboratory and used in space radiation protection applications.

Lastly, the problems of free-space radiation transport and shielding has been addressed using a high-charge-and-energy (HZE) transport computer program, which is referred to as the HZETRN program. The HZETRN program (referred to herein as 1995 HZETRN) has been widely used in prior shield design verification and validation processes. Additionally, the BRYNTRN code, discussed in F. A. Cucinotta, "Extension of the BRYNTRN code to monoenergetic light ion beams," NASA TP-3472, 1994, is a baryon transport code used to calculate the energy spectrum of secondary nucleons, and has been widely used. 1995 HZETRN is described in detail by J. W. Wilson et al. in "HZETRN: Description of a Free-Space Ion and Nucleon Transport and Shielding Computer Program," NASA TP-3495, May 1995, which is hereby incorporated by reference in its entirety. 1995 HZETRN is designed to provide fast and accurate dosimetric information for the design and construction of space modules and devices. The program is based on a one-dimensional space-marching formulation of the Boltzmann transport equation with a straight-ahead approximation. The general Boltzmann equation was simplified by using standard assumptions to derive the straight-ahead equation in the continuous slowing-down approximation and by assuming that heavy projectile breakup conserves velocity. The effect of the long-range Coulomb force and electron interaction was treated as a continuous slowing-down process. Atomic (electronic) stopping power coefficients with energies above a few A MeV were calculated by using Bethe's theory including Bragg's rule, Ziegler's shell corrections, and effective charge. Nuclear absorption cross sections were obtained from fits to quantum calculations and total cross sections were obtained with a Ramsauer formalism. Nuclear fragmentation cross sections were calculated with a semi-empirical abrasion-ablation fragmentation model. An environmental model was also used to provide input to the HZE transport computations.

Nevertheless, improved spacecraft shield design to support planned missions to the moon and Mars requires early entry of radiation constraints into the design process to maximize performance and minimize costs. Of particular importance is the need to implement probabilistic models to account for design uncertainties in the context of optimal design processes. These requirements need supporting tools with high computational efficiency to enable appropriate design methods.

Accordingly, there is a need for an apparatus, method and program storage device for calculating high-energy neutron/ion transport to a target of interest.

It can also be seen that there is a need for an improved radiation shield design apparatus, method and program storage device that implements improvements to the database, basic numerical procedures, and algorithms along with new methods of verification and validation to capture a well defined algorithm for engineering design processes to be used in an early development phase of space exploration shield designs.

SUMMARY OF THE INVENTION

To overcome the limitations described above and to overcome other limitations that will become apparent upon reading and understanding the present specification, the present invention discloses an apparatus, method and program storage device for determining high-energy neutron/ion transport to a target of interest.

The present invention solves the above-described problems by advancing, verifying and validating the transport codes for calculating high-energy neutron/ion transport to a target of interest. The database, basic numerical procedures, and computation method are improved. In addition, benchmarks are provided for evaluating further problems, for providing code portability and for identifying database drift.

A method for calculating high-energy neutron/ion transport to a target of interest includes: (1) defining boundaries for a calculation of a high-energy neutron/ion transport to a target of interest; (2) calculating the high-energy neutron/ion transport to the target of interest using numerical procedures selected to reduce local truncation error by including higher order terms and to allow absolute control of propagated error by ensuring truncation error is third order in step size, and using scaling procedures for flux coupling terms modified to improve computed results by adding a scaling factor to terms describing production of j-particles from collisions of k-particles; and (3) providing the calculated high-energy neutron/ion transport to modeling modules to control an effective radiation dose at the target of interest.

In another embodiment of the present invention, a computer program product embodied in a computer readable medium and adapted to perform operations for calculating high-energy neutron/ion transport across a material of interest is provided. The operations include: (1) defining boundaries for a calculation of a high-energy neutron/ion transport to a target of interest; (2) calculating the high-energy neutron/ion transport to the target of interest using numerical procedures selected to reduce local truncation error by including higher order terms and to allow absolute control of propagated error by ensuring truncation error is third order in step size, and using scaling procedures for flux coupling terms modified to improve computed results by adding a scaling factor to terms describing production of j-particles from collisions of k-particles; and (3) providing the calculated high-energy neutron/ion transport to modeling modules to control an effective radiation dose at the target of interest.

In a further embodiment of the present invention, a device configured to calculate high-energy neutron/ion transport to a target of interest is provided. The device includes memory for storing data defining boundaries for a calculation of a high-energy neutron/ion transport to a target of interest; and a processor, coupled to the memory, the processor: (1) calculating the high-energy neutron/ion transport to the target of interest using numerical procedures selected to reduce local truncation error by including higher order terms and to allow absolute control of propagated error by ensuring truncation error is third order in step size, and using scaling procedures for flux coupling terms modified to improve computed results by adding a scaling factor to terms describing production of j-particles from collisions of k-particles; and (2) providing the calculated high-energy neutron/ion transport to modeling modules to control an effective radiation dose at the target of interest.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

Figure 1:
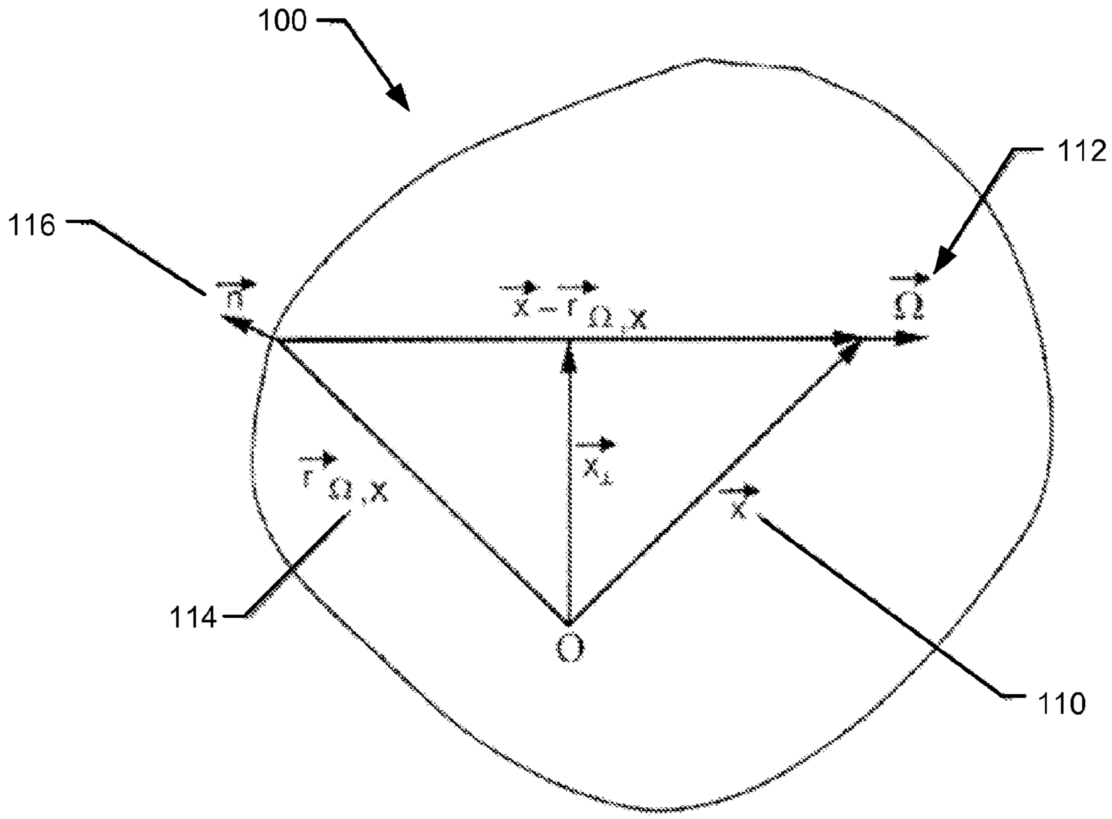
FIG. 1 Prior Art
FIG. 1 is a plot illustrating the geometric relations of quantities relevant to the transport equations derived from the coupled linear Boltzmann equations for a closed convex domain according to an embodiment of the present invention.

In the following description of the embodiments, reference is made to the accompanying drawings that form a part hereof, and in which is shown by way of illustration the specific embodiments in which the invention may be practiced. It is to be understood that other embodiments may be utilized as structural changes may be made without departing from the scope of the present invention.

The present invention provides an apparatus, method and program storage device for calculating high-energy neutron/ion transport to a target of interest, and is discussed in J. W. Wilson et al. in "Standardized Radiation Shield Design Method: 2005 HZETRN," 06ICES-18, which is hereby incorporated by reference herein in its entirety.

Crewmembers in a space module will be exposed to both ionizing and non-ionizing radiation. Ionizing radiation, which breaks chemical bonds in biological systems, can have immediate (acute) as well as latent effects, depending on the magnitude of the radiation dose absorbed, the species of ionizing radiation, and the tissue affected. The ionizing radiation in space is comprised of charged particles, uncharged particles, and high-energy electromagnetic radiation. The particles vary in size from electrons (beta rays) through protons (hydrogen nuclei) and helium atoms (alpha particles), to the heavier nuclei encountered in cosmic rays, e.g., HZE particles (High Z and Energy, where Z is the charge). They may have single charges, either positive (protons, p) or negative (electrons, e); multiple charges (alpha or HZE particles); or no charge, such as neutrons. The atomic nuclei of cosmic rays, HZE particles, are usually completely stripped of electrons and thus have a positive charge equal to their atomic number.

The ionizing electromagnetic radiation consists of x-rays and gamma-rays, which differ from each other in their energy and add little to extraterrestrial space exposures. By convention, X-rays have a lower energy than the gamma-rays, with the dividing line being at about 1 MeV. In general, x-rays are produced either by the interaction of energetic electrons with inner shell electrons of heavier elements or through the braking radiation mechanism when deflected by the Coulomb field of the atomic nuclei of the target material. Gamma-rays are usually products of the de-excitation of excited heavier elements.

Mass shielding is the main means of protecting crewmembers from space radiation. Space modules are constructed with an outer skin and associated structural members, and sometimes an outer micrometeoroid/space debris shield. In addition, the space module contains specialized equipment with considerable mass and internal structural features (e.g., walls, cabinets) which can provide some additional shielding, but in only some specific directions as these masses are not distributed uniformly and/or isotropically.

Improved spacecraft shield design requires early entry of radiation constraints into the design process to maximize performance and minimize costs. The atomic and nuclear processes associated with space radiation occur over very short time scales (microseconds) compared with the secular variations of the space environment. This allows the use of a time independent master equation represented by a steady-state Boltzmann description balancing gains and losses of the particle fields, e.g., Galactic Cosmic Rays (GCR) and Solar Particle Events (SPE), interacting with the shield material (including the human tissues). This equation may be reduced to a readily soluble numerical process.

The specification of the interior environment within a spacecraft and evaluation of the effects on the astronaut is at the heart of the space radiation protection problem. The relevant transport equations are the coupled linear Boltzmann equations for a closed convex domain.

FIG. 1 is a plot 100 illustrating the geometric relations of quantities relevant to the transport equations derived from the coupled linear Boltzmann equations for a closed convex domain according to an embodiment of the present invention. FIG. 1 establishes the frame of reference for $\phi_j(x, \Omega, E)$ representing the flux of ions of type j at x 110 with motion along Ω 112, where Γ 114 is the point on the boundary connected to x 110 along Ω 112 and n 116 is the unit normal vector at the boundary surface at point Γ 114. The coupled linear Boltzmann equations are derived on the basis of conservation principles for the flux density (particles/cm$^2$–sr–s–A–MeV) $\phi_j$(x Ω, E) for particle type j as:

$$\Omega \bullet \nabla \phi_j(x,\Omega,E)=\Sigma_k \int \sigma_{jk}(\Omega,\Omega',E,E')\phi_k(x,\Omega',E')d\Omega' dE' - \sigma_j(E)\phi_j(x,\Omega,E), \quad (1)$$

where $\sigma_j$(E) and $\sigma_{jk}$(Ω,Ω',E,E') are the shield media macroscopic cross sections. The $\sigma_{jk}$(Ω,Ω',E,E') represent all those processes by which type k particles moving in direction Ω' with energy E' produce a type j particle in direction Ω with energy E (including decay processes). Note that there may be several reactions that produce a particular product, and the appropriate cross sections for equation (1) are the inclusive ones. Exclusive processes are functions of the particle fields and may be included once the particle fields are known. Note, at times $\Omega_j$(x, Ω, E) will be loosely referred to as either flux or fluence and the usage should be clear from the context. The time scale of the processes in equation (1) are at most on the order of microseconds while the time scales of boundary conditions are on the order of minutes or longer, leaving the resulting interior fields in equilibrium with the particles at the boundary.

The total cross section $\sigma_j$(E) with the medium for each particle type is:

$$\sigma_j(E)=\sigma_j^{at}(E)+\sigma_j^{el}(E)+\sigma_j^{r}(E), \quad (2)$$

where the first term refers to collision with atomic electrons, the second term is for elastic scattering on the nucleus, and the third term describes nuclear reactions where the minor nuclear inelastic processes (excited single particle states) have been ignored except for low energy neutron collisions. The corresponding differential cross sections are similarly ordered. Many atomic collisions (~10$^6$) occur in a centimeter of ordinary matter, whereas ~10$^3$ nuclear coulomb elastic collisions occur per centimeter, while nuclear scattering and reactive collisions are separated by a fraction to many centimeters depending on energy and particle type. The $\sigma_j^r$(E) term includes the nuclear decay processes. Solution methods first use physical perturbations based on the ordering of the cross sections with the frequent atomic interactions as the first physical perturbation with special methods used for neutrons for which atomic cross sections are zero. The first physical perturbation to be treated is the highly directed atomic collisions with mean free paths on the order of micrometers as observed in nuclear emulsion.

Figure 2:
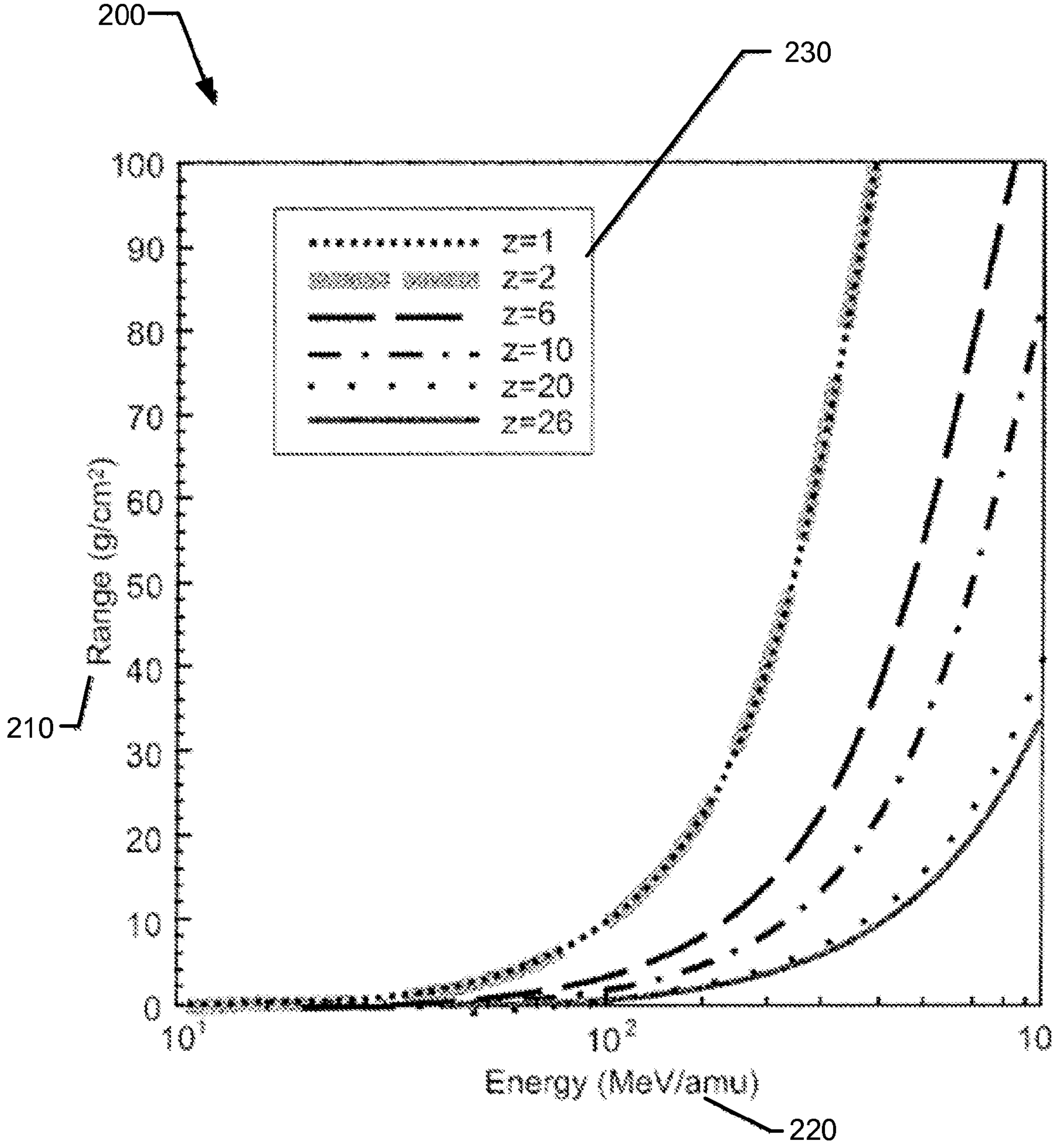
FIG. 2 Prior Art
FIG. 2 is a plot illustrating the range of ions in aluminum.

FIG. 2 is a plot 200 illustrating the range of ions in aluminum. The usual approximation is the continuous slowing down approximation leading to well-specified range-energy relations as shown in FIG. 2. In FIG. 2, the range 210 is plotted against the energy 220 of ions in aluminum for a range of Z values 230. In FIG. 2, the energy straggling is neglected. This energy straggling will be discussed later. The next term is the highly directed multiple Coulomb scattering. This term is usually neglected in many models, but is of great importance in understanding the transport of unidirectional ion beams leading to beam divergence. The remaining nuclear reactive processes have been given main attention in past code developments.

Continuous Slowing Down Approximation

The collisions with atomic electrons preserve the identity of the ion and the differential cross sections are given as:

$$\sigma_{jk}^{at}(\Omega,\Omega',E,E')=\Sigma_n \sigma^{at}_{j,n}(E')\delta(\Omega-\Omega')\delta_{jk}\times\delta(E+A_j^{-1}\epsilon_n-E'), \quad (3)$$

where n refers to the atomic/molecular excited states with excitation energies $\epsilon_n$ including the continuum. Note, the factor $A_j^{-1}$ results from the units of E of A MeV (equivalent unit of MeV/nucleon with atomic weight $A_j$). Although the atomic/molecular cross-sections $\sigma^{at}_{j,n}$(E') are large (≈10$^{-16}$ cm$^2$), the energy transfers $\epsilon_n$ are small (≈1-100 eV) compared to the particle energy. The atomic/molecular terms of equation (1) may be written as:

$$\begin{aligned}\Sigma \int \sigma_{jk}^{at}(\Omega, \Omega', E, E')\phi_k(x, \Omega', E')d\Omega' dE' - \sigma_j^{at}(E)\phi_j(x, \Omega, \\ E = \Sigma_n \sigma_{j,n}^{at}(E + A_j^{-1}\varepsilon_n)\phi_j(x, \Omega, E + A_j^{-1}\varepsilon_n) - \sigma_j^{at}(E)\phi_j(x, \Omega, E) = \\ \Sigma_n\{\sigma_{j,n}^{at}(E)\phi_j(x, \Omega, E) + A_j^{-1}\varepsilon_n\partial_E[\sigma_{j,n}^{at}(E)\phi_j(x, \Omega, E)]\} - \\ \sigma_j^{at}(E)\phi_j(x, \Omega, E) + O(\varepsilon_n^2) = \\ \partial_E[S_j(E)\phi_j(x, \Omega, E)] + O(\varepsilon_n^2),\end{aligned} \quad (4)$$

where the stopping power $S_j$(E) is given as the sum of energy transfers and atomic excitation cross sections as:

$$S_j(E)=\Sigma_n \epsilon_n \sigma^{at}_{j,n}(E) \quad (5)$$

The higher order terms of equation (4) are neglected in the continuous slowing down approximation (csda). Evaluation of the stopping power by equation (5) is deceptively simple in that all of the excited states including continuum states of the atomic/molecular system need to be known. Furthermore, the projectile remains a bare ion except at low energies, where the projectile ion atomic orbital states begin to resonate with the electrons of the media leading to electron capture and lowering of the ion charge. Equation (1) can be written in the csda as:

$$\Omega \bullet \nabla \phi_j(x,\Omega,E)-A_j^{-1}\partial_E[S_j(E)\phi_j(x,\Omega,E)]=\Sigma\int\sigma_{jk}(\Omega,\Omega',E,E')\phi_k(x,\Omega',E')d\Omega' dE'-\sigma_j(E)\phi_j(x,\Omega E), \quad (6)$$

where the right-hand side of equation (6) excludes the atomic/molecular processes now appearing on the left as an energy shifting operator in addition to the usual drift term. Neutral particles would have null atomic cross sections for which the stopping term of equation (6) does not appear. Application of csda in both laboratory and space shielding has been widespread, including the resulting errors. Equation (6) can be rewritten as an integral equation:

$$\phi_j(x,\Omega,E)=\{S_j(E_\gamma)P_j(E_\gamma)\phi_j(\Gamma(\Omega,x),\Omega,E_\gamma)+\Sigma\int_E^{E\gamma}dE' A_j P_j(E')\int_{E'}^{\infty}\int_{4\pi}dE'' d\Omega' \sigma_{jk}(\Omega,\Omega',E'E'')\times\phi_k(x+[R_j(E)-R_j(E')]\Omega,\Omega',E'')\}/S_j(E)P_j(E), \quad (7)$$

where, again referring to FIG. 1, Γ 114 is the point on the boundary connected to x 110 along Ω 112, $E_\gamma=R_j^{-1}[\rho-d+R_j]$, ρ is the projection of x 110 onto Ω 112, d is the projection of Γ 114 onto Ω 112, $R_j$(E) is the distance an ion of type j of energy E will travel before losing all of its energy to excitation of atomic electrons, and $P_j$(E) is the probability a type j ion of energy E will have a nuclear reaction in coming to rest in the media. The usual range-energy relation is given by:

$$R_j(E)=\int A_j dE'/S_j(E') \quad (8)$$

Figure 3:
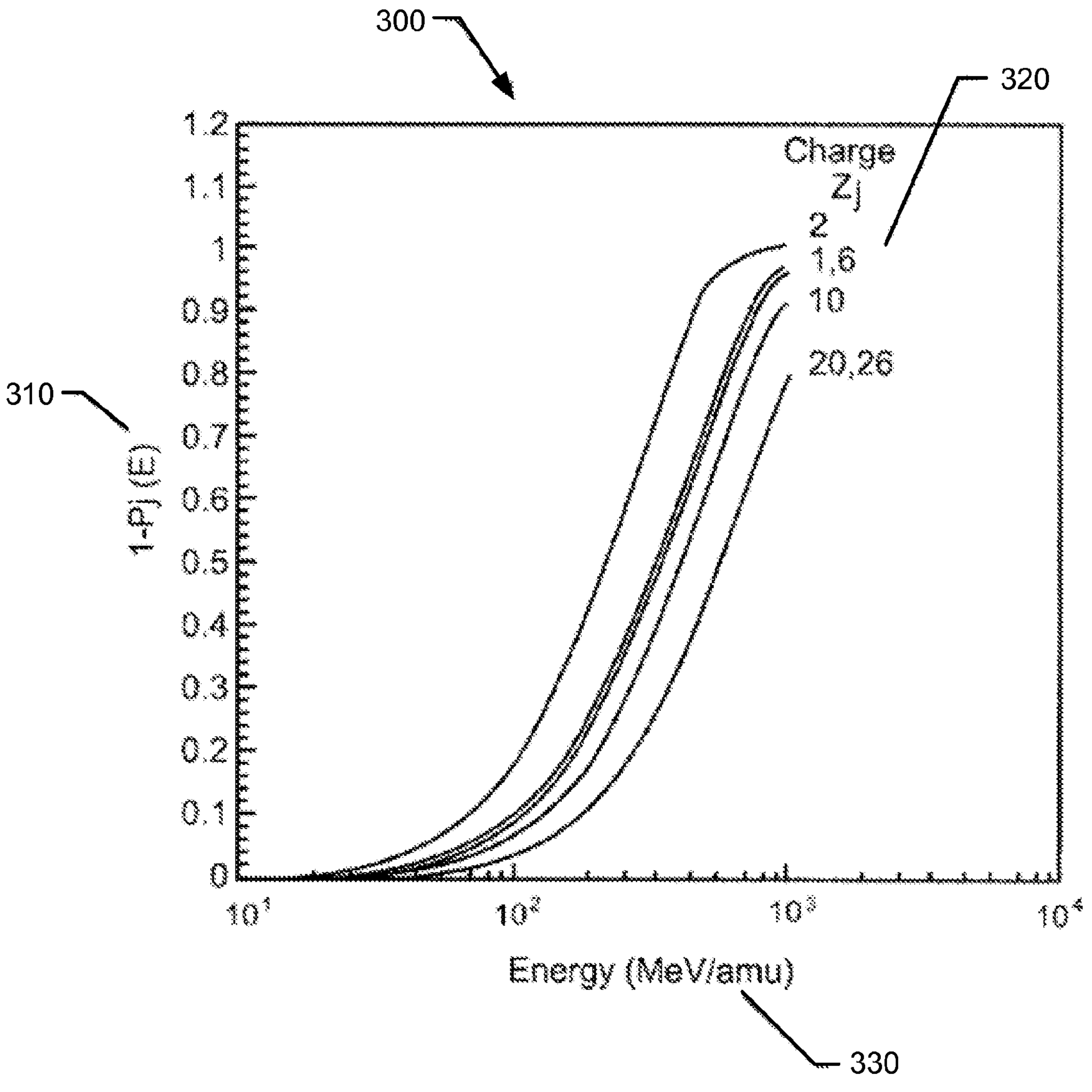
FIG. 3 Prior Art
FIG. 3 is a plot illustrating the probability of nuclear reaction as a function of ion type and energy.

FIG. 3 is a plot 300 illustrating the probability of nuclear reaction 310 as a function of ion type 320 and energy 330. With reference to FIG. 3, the nuclear attenuation function is given by:

$$P_j(E)=\exp[-\int A_j\sigma^r j(E')dE'/S_j(E')], \quad (9)$$

where the integral domains in equations (8) and (9) extend over the full energy range {0, E}.

Straight-Ahead Approximation

The approach to a practical solution of equation (7) is to develop a progression of solutions from the simple to the complex, allowing early implementation of high-performance computational procedures and establishing a converging sequence of approximations with established accuracy criteria and means of verification. The lowest order approximation using the straight-ahead approximation uses the Monte Carlo methods, in which the differential cross sections are approximated as:

$$\sigma^r_{jk}(\Omega,\Omega'E,E')\approx\sigma^r_{jk}(E,E)\delta(\Omega-\Omega'), \quad (10)$$

resulting in dose and dose equivalent per unit fluence to be within the statistical uncertainty of the Monte Carlo result obtained using the fully angle dependent cross sections. The relation of angular dependent cross sections to spacecraft geometry in space application is examined using asymptotic expansions about angular divergence parameters demonstrating errors in the straight-ahead approximation to be on the order of the square of the ratio of distance of divergence to radius of curvature of the shield (a small error in most space systems).

Equations (6) and (7) were examined for HZE ions using the following form for the projectile fragmentation cross sections as:

$$\sigma^r_{jk}(\Omega,\Omega'E,E')=\sigma^r_{jk}(E')N_r\exp\{-[\Omega\sqrt{E}-\Omega\sqrt{E'}]^2/2\epsilon_{jk}^2\}, \quad (11)$$

where $\sigma^r_{jk}(E')$ is the cross section for producing fragment j from ion k, $N_t$ is the normalization constant for the exponential function, and $\epsilon_{jk}$ is the momentum dispersion parameter in the reaction. Substituting the interactive form of equation (11) into the integral term of the Boltzmann equation (6) yields $$\Sigma\int\sigma^r_{jk}(\Omega,\Omega'E,E')\phi_k(x,\Omega',E')d\Omega'dE'=\Sigma\sigma^r_{jk}(E')\{\phi_k(x,\Omega,E)+E\partial_E\phi_k(x,\Omega,E)\sqrt{[\epsilon_{jk}^2/(2mE)]}+\Omega\bullet\partial_\Omega\phi_k(x,\Omega,E)\,\epsilon_{jk}^2/(2mE)\}, \quad (12)$$

where the second term on the right hand side of equation (12) results from corrections in assuming the velocity of the ion is preserved in the interaction, and the third term is error resulting from the straight-ahead assumption. The surprising result is that the velocity conserving assumption is inferior to the straight-ahead approximation for the nearly isotropic space radiation. Under approximations examined in equations (4) and (12), there are great simplifications in the Boltzmann equation, as given below $$\Omega\bullet\nabla\phi_j(x,\Omega,E)-A_j^{-1}\partial_E[S_j(E)\phi_j(x,\Omega,E)]=\Sigma\sigma^r_{jk}(E)\phi_k(x,\Omega,E)-\sigma^r_j(E)\phi_j(x,\Omega,E) \quad (13)$$

which is strictly applicable to the HZE ions (Z>2). The light ions and neutrons have additional complications arising from the broad energy spectra associated with their production, although the more favorable straight-ahead approximation is useful, as indicated in equation (12). The corresponding light ion (and neutron) Boltzmann equation is:

$$\Omega\bullet\nabla\phi_j(x,\Omega,E)-A_j^{-1}\partial_E[S_j(E)\phi_j(x,\Omega E)]=\Sigma\int\sigma_{jk}(E,E')\phi_k(x,\Omega',E')dE'-\sigma_j(E)\phi_j(x,\Omega,E), \quad (14)$$

where the straight-ahead approximation as given by equation (10) is used. Equations (13) and (14) have sufficient simplicity to allow an approach for both space and laboratory applications. The main force of the laboratory applications allow detailed model testing of the many atomic/molecular and nuclear processes.

Marching Procedures and HZETRN

Both the 1995 HZETRN and 2005 HZETRN are based on the solution of equation (14) using straight-ahead approximation, as described by equations (10) through (12). Specializing the solution along a ray Ω in the direction of the x-axis results in the one dimensional description of the Boltzmann equation as:

$$[\partial x-A_j^{-1}\partial_E S_j(E)+\sigma_j]\phi_j(x,E)=\Sigma_k\int\sigma_{jk}(E,E')\phi_k(x,E')dE' \quad (15)$$

Where $\sigma_{jk}(E,E')$ are approximated for nucleons. An immediate problem is the near singular nature of the differential operator, and transformation from energy to residual range coordinates as used in developing the Green's function greatly relieves this problem. Unlike the Green's function development, numerical procedures are simplified by introducing only a single residual range coordinate for all ions. The residual proton range r is used as the common coordinate:

$$r=\int_0^E dE'/S(E') \quad (16)$$

and the residual range of other particle types is related through a scaling parameter $v_j=Z_j^2/A_j$ as $v_j r_j\approx r$, wherein $A_j$ and $Z_j$ are mass number and charge number, respectively, which fails at low energies corresponding to low residual range due to electron capture into atomic orbitals characteristic to each ion type. The corresponding transport equation is:

$$[\partial_x-v_j\partial_r+\sigma_j(r)]\psi_j(x,r)=\Sigma_k\int_r^\infty(v_j/v_k)S_{jk}(r,r')\psi_k(x,r')dr', \quad (17)$$

where scaled flux is now ($v_j$ for neutral particles such as neutrons are taken as unity in scaling relations):

$$\psi_j(x,r)=v_jS(E)\phi_j(x,E), \quad (18)$$

and the sealed differential cross sections are:

$$S_{jk}(r,r')=S(E)\sigma_{jk}(E,E'). \quad (19)$$

Errors in scaling of proton-stopping and range parameters in arriving at the approximate transport equation (17) are compensated in part by solutions of equation (17) approaching a low energy equilibrium spectrum for ions given by:

$$v_jS(E)\phi_j(x,E)\Rightarrow\text{constant}, \quad (20)$$

where the constant is fixed by the higher ion energy. In distinction, the solution to equation (15) for ions has the low energy equilibrium spectrum:

$$A_j^{-1}S_j(E)\phi_j(x,E)\Rightarrow\text{constant}, \quad (21)$$

which is also fixed by the higher energy flux for which the range scaling relation $v_j r_j\approx r$ has better validity and the two constants are nearly equal so that equation (21) has improved accuracy over equation (20) at lower energies. This fact requires alteration of the flux unscaling relations as demanded by equation (21) to maintain accuracy at the lower energies. From equations (20) and (21), the simplicity of numerically solving equation (17) can be understood over a numerical solution based on equation (15). The solution to equation (17) approaches a constant at small residual ranges, allowing large separations in r grid values with smooth extrapolation to zero range, whereas solutions of equation (15) vary as the nearly singular $1/S_j(E)$ for which small E grid spacing is required, leading to slow computational procedures. The assumptions in equation (17) are tested and unscaled according to relation (21) as shown later herein.

The confusion caused by different scaling methods and associated coordinates for numerical procedures is justified by the simplification of the numerical representation of fluence of all particle types over a common residual range grid and simplification of the numerical procedures leading to high performance codes. Still a straightforward finite differencing of equation (17) can introduce unstable roots, as had plagued the thermal transport problem for many years. The differential operator of equation (7) is inverted as shown by:

$$\psi_j(x,r)=\exp[-\zeta_j(r,x)]\psi_j(0,r+v_jx)+\Sigma_k\int_0^x\int_{r+v_jx'}^\infty\exp[-\zeta_j(r,x')](v_j/v_k)s_{jk}(r+v_jx',r')\times\psi_k(x-x',r')dr'dx', \quad (22)$$

where the exponential is the integrating factor related to attenuation of the j type ions with:

$$\zeta_j(r,x)=\int_o^x \sigma_j(r+v_j x')dx', \quad (23)$$

which is related to equation (9). Equation (22) is a Volterra equation and can be solved either as a Neumann series or with marching procedures. Note that the inverse mapping is taken as:

$$\phi_j(x,E)=A_j\psi_j(x,r)/S_j(E), \quad (24)$$

to guarantee the equilibrium solution given as equation (21) at low energies away from the boundaries (note, the proton stopping power is used in case of unscaling the neutron flux). The equilibrium constant resulting from equation (22), and given in equation (20), is assumed to differ little from condition (21), for which the inverse mapping of equation (24) is most accurate. These approximations are verified later herein.

Two tracks are taken in implementing a marching procedure for equation (22) depending on particle type as demanded by the character of the nuclear processes. The problem naturally divides into "light ions," which will refer to all ions with atomic mass of four or less including neutrons, and into high charge-energy (HZE) ions having atomic mass greater than 4. The distinction arises from the energy and angle distributions of the double differential cross sections, for which the HZE ions leaving a projectile fragmentation event have velocity nearly equal to that of the projectile, as approximated by equation (11). Although the light ions are assumed to travel in the same direction as the projectile (see equation 10), they cover a broad energy distribution that cannot be ignored. The marching procedure is obtained by first considering equation (22) evaluated at x+h, where h is the step size as follows:

$$\psi_j(x+h,r)=\exp[-\zeta(r,h)]\psi_j(x,r+v_jh)+\Sigma_k\int_0^h\int_{r+v_jx'}^\infty \exp[-\zeta_j(r,x')](v_j/v_k)s_{jk}(r+v_jx',r')\times\psi_k(x+h-x',r')dr'dx'. \quad (25)$$

Equation (25) may be used to develop a marching step from x to x+h once a means to approximate the field function $\psi_j(x,r)$ across the subinterval {x, x+h} is provided. If h is sufficiently small such that $$\sigma_j(r)h<<1, \quad (26)$$

then, following lowest order perturbation theory:

$$\psi_k(x+h-x',r')=\exp[-\zeta_k(r',h-x')]\psi_k[x,r'+v_k(h-x')]+O(h), \quad (27)$$

which may be used to approximate the integral in equation (25), giving results for the fields $O(h^2)$ as required to control the propagated error. Substituting equation (27) into (25) and evaluating the attenuation factors at the interval midpoint (mean value theorem) results in:

$$\psi_j(x+h,r)=\exp[-\zeta_j(r,h)]\psi_j(x,r+v_jh)+\Sigma_k\exp[-\zeta_j(r,h/2)-\zeta_k(r',h/2)]\times\int_{r+v_jh/2}^\infty (v_j/v_k)F^\Delta_{jk}(h,r,r')\psi_k(x,r'+v_kh/2)]dr'+O(h^2), \quad (28)$$

where the integrand has been simplified using $$F^\Delta_{jk}(h,r,r')=\int_0^h s_{jk}(r+v_jx',r')dx'=F_{jk}(r+v_jh,r')-F_{jk}(r,r'), \quad (29)$$

and $$F_{jk}(r,r')=\int_0^{\epsilon(r)}\sigma_{jk}(E'',E')dE'', \quad (30)$$

with $\epsilon(r)$ being the energy associated with proton residual range r, and $E'=\epsilon(r')$. Note that if j corresponds to a neutral particle, such as the neutron (j=n), then the above expressions are evaluated in the limit as $v_j$ approaches zero in the range scaling relations, resulting in the following (whereas the flux scaling factor for neutrons assumes $v_n=1$):

$$\psi_n(x+h,r)=\exp[-\sigma_n(r)h]\psi_n(x,r)+\Sigma_{k\neq n}\exp[-\sigma_n(r)h/2-\zeta_k(r',h/2)]h\times\int_r^\infty(1/v_k)s_{nk}(r,r')\psi_k(x,r'+v_kh/2)dr'+\exp[-\sigma_n(r)h/2-\sigma_n(r')h/2]h\int_r^\infty s_{nn}(r,r')\psi_n(x,r')dr', \quad (31)$$

and similarly for the neutral k term (k=n) when the j particle is charged:

$$\psi_j(x+h,r)=\exp[-\zeta_j(r,h)]\psi_j(x,r+v_jh)+\Sigma_{k\neq n}\exp[-\zeta_j(r,h/2)-\zeta_k(r',h/2)]\int_r^\infty(v_j/v_k)F^\Delta_{jk}(h,r,r'+v_jh/2)\times\psi_k[x,r'+(v_j+v_k)h/2)]dr'+\exp[-\zeta(r,h/2)-\sigma_n(r')h/2]\times\int_r^\infty v_jF^\Delta_{jn}(h,r,r'+v_jh/2)\psi_n(x,r'+v_jh/2)dr', \quad (32)$$

where $v_n$ in the flux scaling relation (24) is taken as unity. Equations (31) and (32) are solved on an equally space x-grid Δx=h apart and a logarithmic spaced r-grid on two subintervals. The remaining integrals in these equations are approximated by:

$$\int_{r_k}^\infty K(r_n,r')\psi_j(x,r')dr'\approx\Sigma_{l=k}^\infty K[r_n,(r_l+r_{l+1})2]\int_{rl}^{rl+1}\psi_j(x,r')dr', \quad (33)$$

where ∞ denotes a chosen upper limit tailored to the specific boundary condition. Note that the matrix of K-values can be evaluated once on the r-grid and stored for subsequent steps, providing high computational efficiency. Equations (31) and (32) provide the basis of the light ion transport of both the HZETRN 1995 and the BRYNTRN codes. The HZE ion projectile ($A_j$>4) coupling to the light fragments is contained in equations (28) to (32).

The HZE fragments are produced with nearly the same velocity as the projectile ion, as expressed in equation (13), and results in the simplified Boltzmann equation:

$$[\partial_x-A_j^{-1}\partial_E S_j(E)+\sigma_j(E)]\phi_j(x,E)=\Sigma_k\sigma_{jk}(E)\phi_k(x,E), \quad (34)$$

for which the scaled equations result in contributions from all HZE ions (with $A_k$>4) as:

$$\psi_j(x,r)=\exp[-\zeta_j(r,x)]\psi_j(0,r+v_jx)+\Sigma_k\int_0^x\exp[-\zeta_j(r,x')](v_j/v_k)\times\sigma_{jk}(r+v_jx')\psi_k(x-x',r+v_jx')dx'. \quad (35)$$

The corresponding marching equation is given as:

$$\psi_j(x+h,r)=\exp[-\zeta_j(r,h)]\psi_j(x,r+v_jh)+\Sigma_k\int_0^h\exp[-\zeta_j(r,x')](v_j/v_k)\times\sigma_{jk}(r+v_jx')\psi_k(x+h-x',r+v_jx)dx', \quad (36)$$

for which the integrand can be approximated for sufficiently small h using:

$$\psi_k(x+h-x',r+v_jx')=\exp[-\zeta_k(r+v_jx',h-x')]\times\psi_k[x,r+v_jx'+v_k(h-x')]+O(h), \quad (37)$$

allowing the following simplification:

$$\psi_j(x+h,r)=\exp[-\zeta_j(r,h)]\psi_j(x,r+v_jh)+\Sigma_k\int_0^h\exp[-\zeta_j(r,x')-\zeta_k(r+v_jx',h-x')](v_j/v_k)\times\sigma_{jk}(r+v_jx')\psi_k[x,r+v_jx'+v_k(h-x')]dx'. \quad (38)$$

To evaluate equation (38), the mean value theorem that guarantees linear terms of the final integral to be zero is used. First, the attenuation factor is expanded as:

$$\zeta_j(r,x')=\int_o^{x'}\sigma_j(r+v_jx'')dx''\approx\int_o^{x'}[\sigma_j(r+v_jh/2)+\partial_r\sigma_j(r+v_jh/2)v_j(x''-h/2)]dx'', \quad (39)$$

and similarly for:

$$\zeta_k(r+v_jx',h-x')=\int_o^{h-x'}\sigma_k[r+v_jx'+v_k(h-x'')]dx''\approx\int_o^{h-x'}[\sigma_j(r+v_jx'+v_kh/2)+\partial_r\sigma_j(r+v_jx'+v_kh/2)v_k(x''-h/2)]dx'', \quad (40)$$

while applying the mean value theorem to the remaining factors of equation (38) and neglecting all but linear expansion terms in the integrand yields:

$$\psi_j(x+h, r) = \exp[-\zeta_j(r, h)]\psi_j(x, r+v_j h) + \Sigma_k (v_j/v_k)\sigma_{jk}(r+v_j h/2)\psi_k[x, r+(v_j+v_k)h/2] \times \int_0^h \exp\{-\sigma_j(r+v_j h/2)x' - \sigma_k[r+(v_j+v_k)h/2)(h-x')]\}dx' = \exp[-\zeta_j(r, h)]\psi_j(x, r+v_j h) + \Sigma_k(v_j/v_k)\sigma_{jk}(r+v_j h/2)\psi_k[x, r+(v_j+v_k)h/2] \times [\exp\{-\sigma_j(r+v_j h/2)h\} - \exp\{-\sigma_k[r+(v_j+v_k)h/2)]h\}] \Big/ \{\sigma_k[r+(v_j+v_k)h/2)] - \sigma_j(r+v_j h/2)\} + O(h^2), \tag{41}$$

to be compared with the 1995 HZETRN algorithm to $O[(v_j - v_k)h]$ given as:

$$\psi_j(x+h,r) \approx \exp[-\zeta_j(r,h)]\psi_j(x,r+v_j h) + \Sigma_k(v_j/v_k)\sigma_{jk}(r) \times \psi_k(x,r+v_j h)\{\exp[-\sigma_j(r)h] - \exp[-\sigma_k(r)h]\}/[\sigma_k(r) - \sigma_j(r)]. \tag{42}$$

In earlier versions of BRYNTRN for proton/neutron transport, the flux scaling relation was taken correctly as:

$$\psi_j(x,r) = S(E)\phi_j(x,E), \tag{43}$$

but carried over to the latest BRYNTRN for light-ions/neutron transport. In coupling to HZETRN with scaling given by:

$$\psi_j(x,r) = v_j S(E)\phi_j(x,E), \tag{44}$$

there is an inconsistency in flux scaling which must be accounted. The appropriate coupling is given in equations (38) through (42) with the added factor of $v_j/v_k$ in the field coupling terms. The main effects on solution of the Boltzmann equation are expected for the light ions of $H^2$, $H^3$, and $He^3$ with only minor effects on the major light-ion/neutron components (n, $H^1$, $He^4$). To evaluate these differences in flux scaling, the algorithm of equations (31) through (33) have been used for comparison with the original light-ion/neutron propagator. A 29 Sep. 1989 solar particle event spectrum is used because of its relation to the 23 Feb. 1956 event represented by the proton spectrum ($p/cm^2$–MeV) at the boundary approximated above 30 MeV by:

$$\phi_p(0,E) = (2.034\times10^7/\beta)\times[p(E)/p(30)]^{-4.5}, \tag{45}$$

where p(E) is the proton momentum (MV) given as:

$$p(E) = \sqrt{[E(E+1876)]}, \tag{46}$$

and β is the proton speed relative to the speed of light. A low energy correction below 30 MeV mainly affecting transport results for depths less that 1 $g/cm^2$ in most materials is also added as:

$$\phi_p(0,E) = 1.416\times10^8 \times \exp[-p(E)/102.118]\times(E+938)/p(E), \tag{47}$$

which is in agreement with spectrometer data of the GOES satellite.

Figure 4:
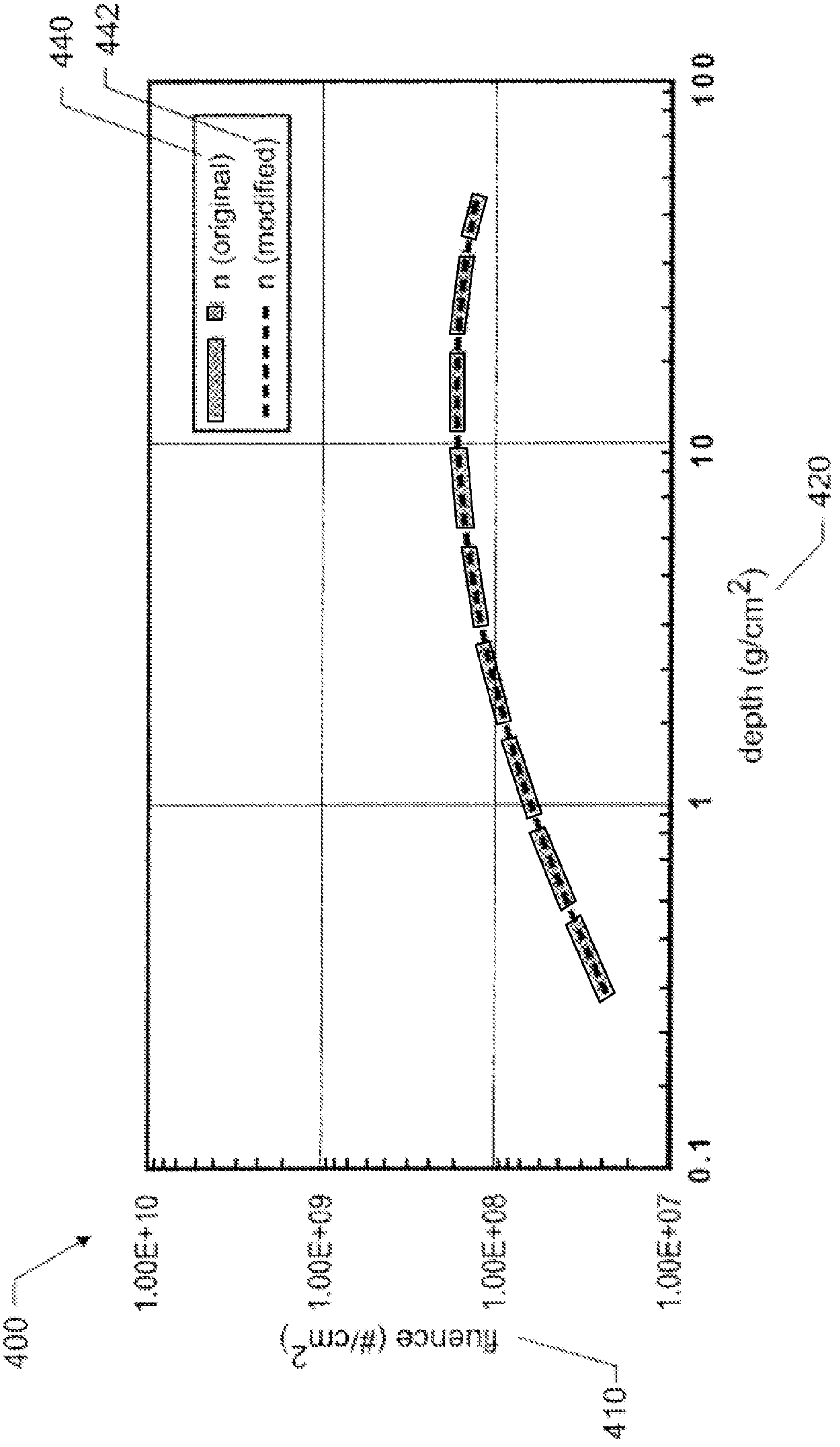
FIG. 4 is a plot illustrating the integral neutron fluence in an aluminum shield using the 1995 HZETRN method and the present method for a Sep. 29, 1989 solar particle event.

FIG. 4 is a plot 400 illustrating the integral neutron fluence in an aluminum shield using the 1995 HZETRN computation method and the present method due to a Sep. 29, 1989 solar particle event. In FIG. 4, the integral fluence 410, in particles/$cm^2$, is plotted against the depths 420, i.e., $g/cm^2$, for both the 1995 HZETRN computation method 440 and the present method 442.

Figure 5:
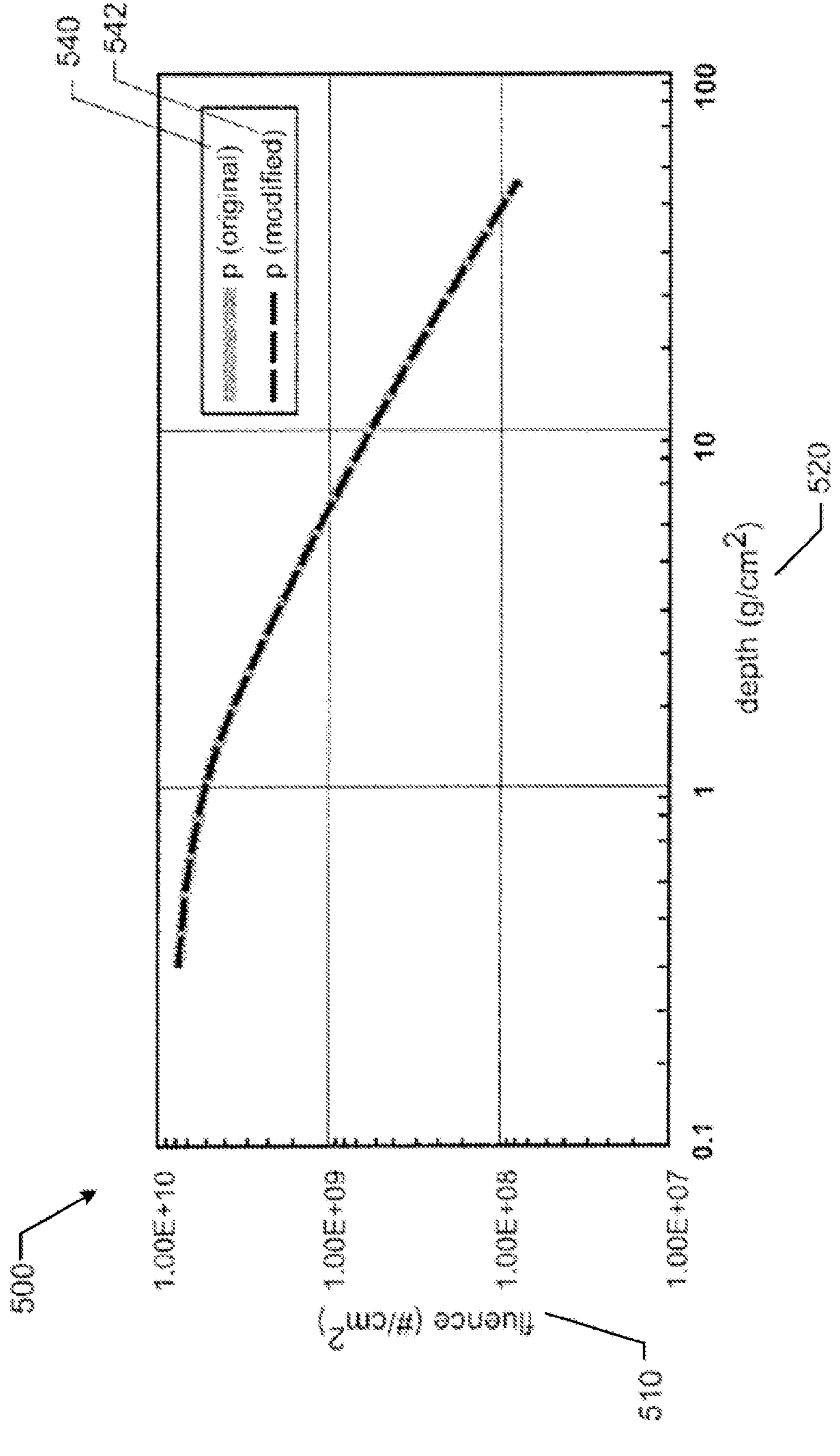
FIG. 5 is a plot illustrating the integral proton fluence in aluminum shield using the 1995 HZETRN method and the present method for the Sep. 29, 1989 solar particle event.

FIG. 5 is a plot 500 illustrating the integral proton fluence in aluminum shield using the 1995 HZETRN computation method and the present method for the Sep. 29, 1989 solar particle event. The integral fluence 510, in particles/$cm^2$, is plotted against the depths 520, i.e., $g/cm^2$, for both the 1995 HZETRN computation method 540 and the present method 542.

Figure 6:
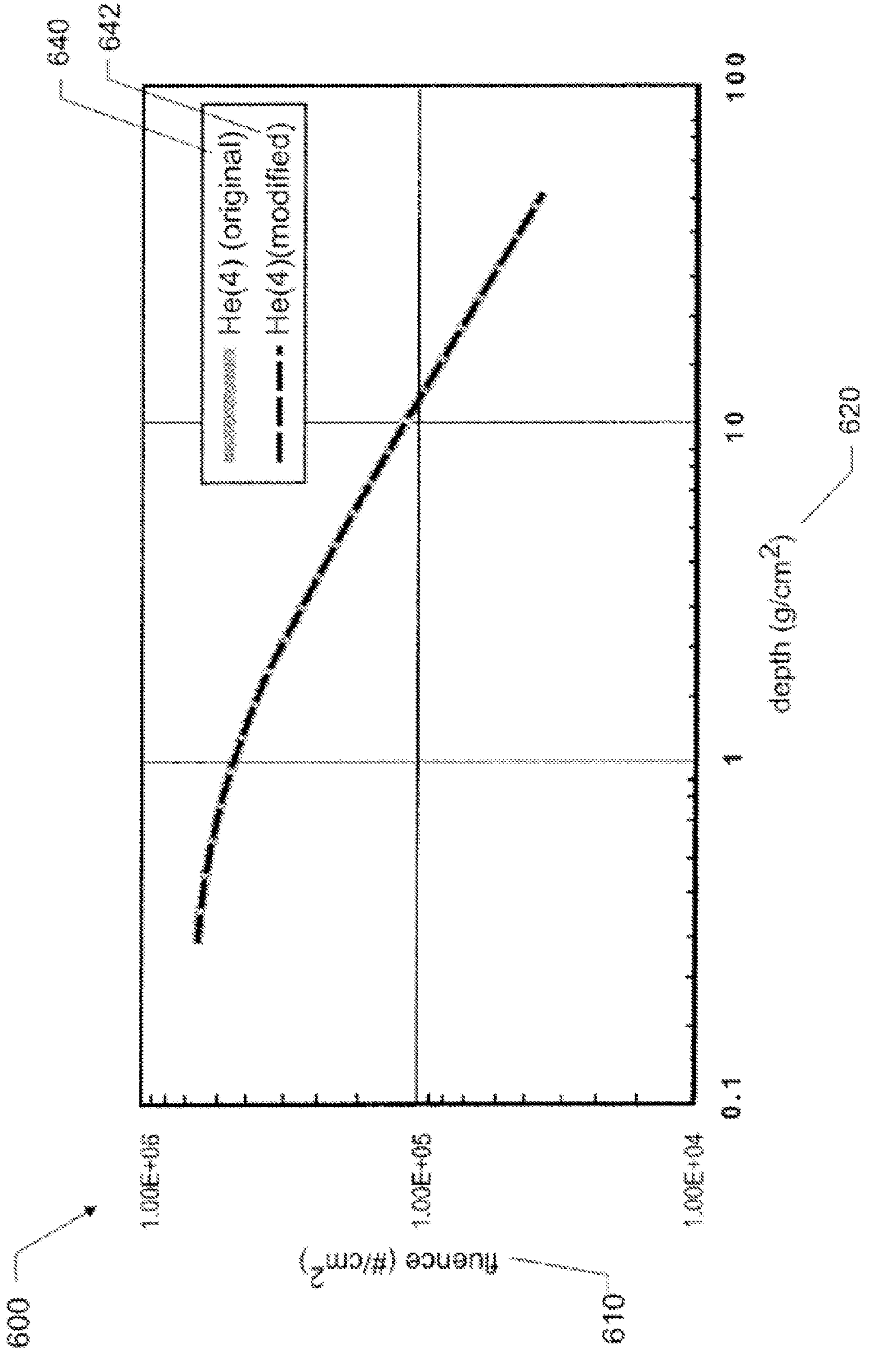
FIG. 6 is a plot illustrating the integral $He^4$ fluence in aluminum shield using the 1995 HZETRN method and the present method for the Sep. 29, 1989 solar particle event.

FIG. 6 is a plot 600 illustrating the integral $He^4$ fluence in aluminum shield using the 1995 HZETRN computation method and the present method for Sep. 29, 1989 solar particle event. Again, the integral fluence 610, in particles/$cm^2$, is plotted against the depths 620, i.e., $g/cm^2$, for both the 1995 HZETRN computation method 640 and the present method 642.

In FIGS. 4-6, the integral fluence values above 0.01 A MeV for neutrons, $H^1$, and $He^4$ with $v_j=1$ are nearly unchanged, and are indistinguishable in FIGS. 4-6, as they are the major components produced in reactions and $H^1$ is dominated by the fluence at the boundary over the first half of the mean free path.

Figure 7:
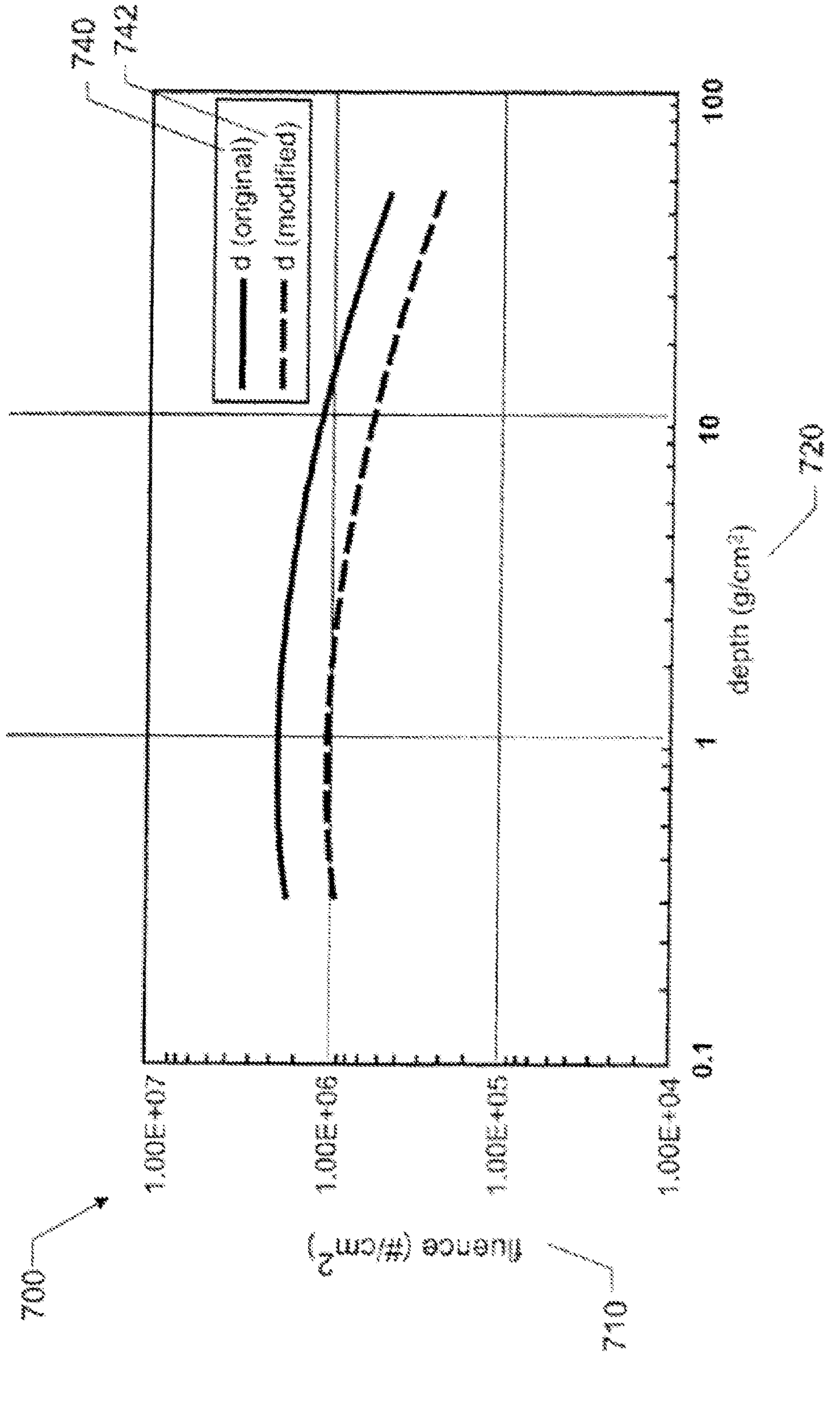
FIG. 7 is a plot illustrating the integral $H^2$ fluence versus depth in an aluminum shield using the 1995 HZETRN method and the present method for the Sep. 29, 1989 solar particle event.
Figure 8:
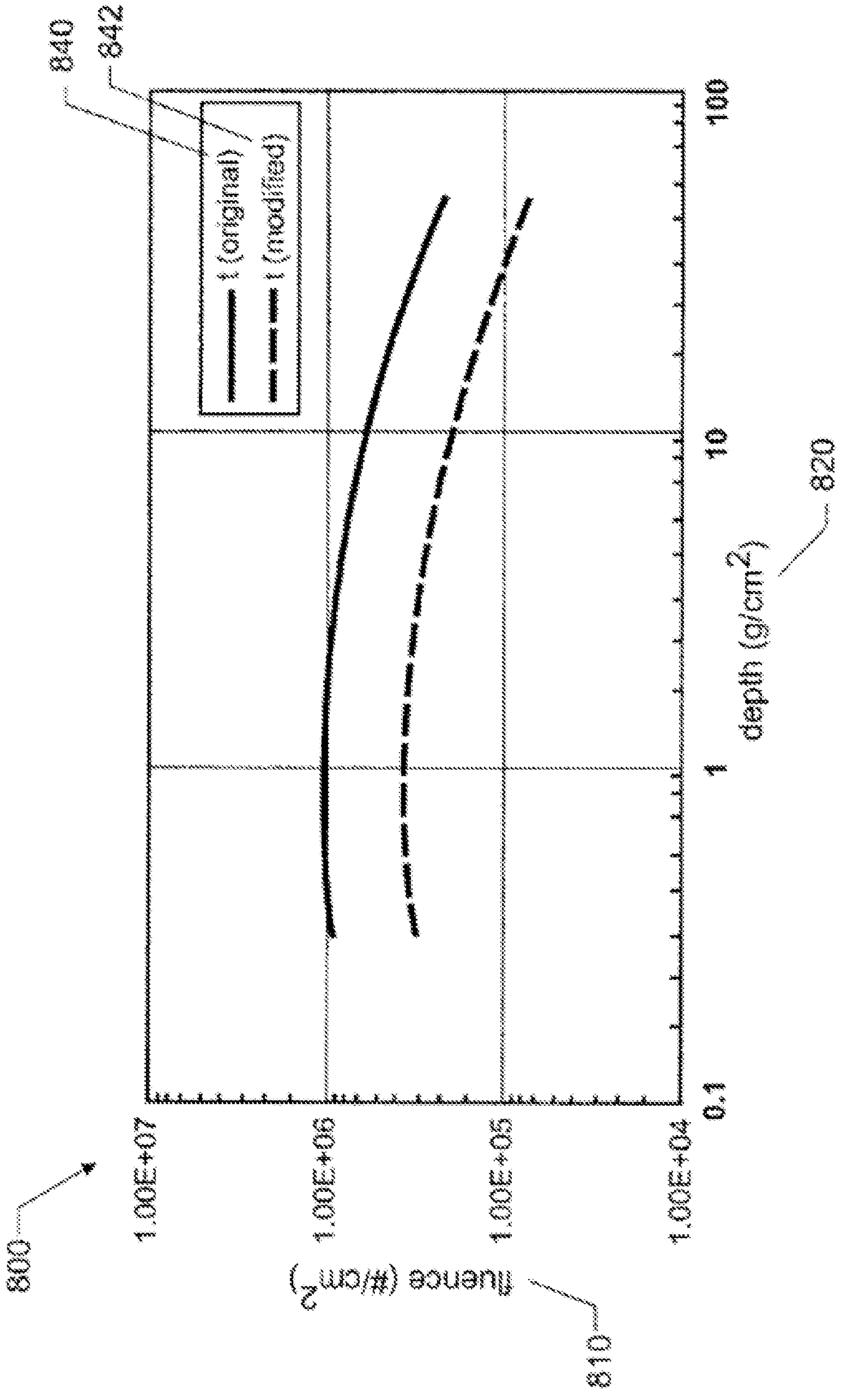
FIG. 8 is a plot illustrating the integral $H^3$ fluence versus depth in an aluminum shield using the 1995 HZETRN method and the present method for the Sep. 29, 1989 solar particle event.

FIG. 7 is a plot 700 illustrating the integral $H^2$ fluence 710 versus depth 720 in an aluminum shield using the 1995 HZETRN method 740 and the present method 742 based on the Sep. 29, 1989 solar particle event. FIG. 8 is a plot 800 illustrating the integral $H^3$ fluence 810 versus depth 820 in an aluminum shield using the 1995 HZETRN method 840 and the present method 842 based on the Sep. 29, 1989 solar particle event. As can be seen in FIGS. 7-8, the $H^2$ and $H^3$ integral fluences are decreased according to their $v_j$ factors with values of ½ and ⅓ respectively.

Figure 9:
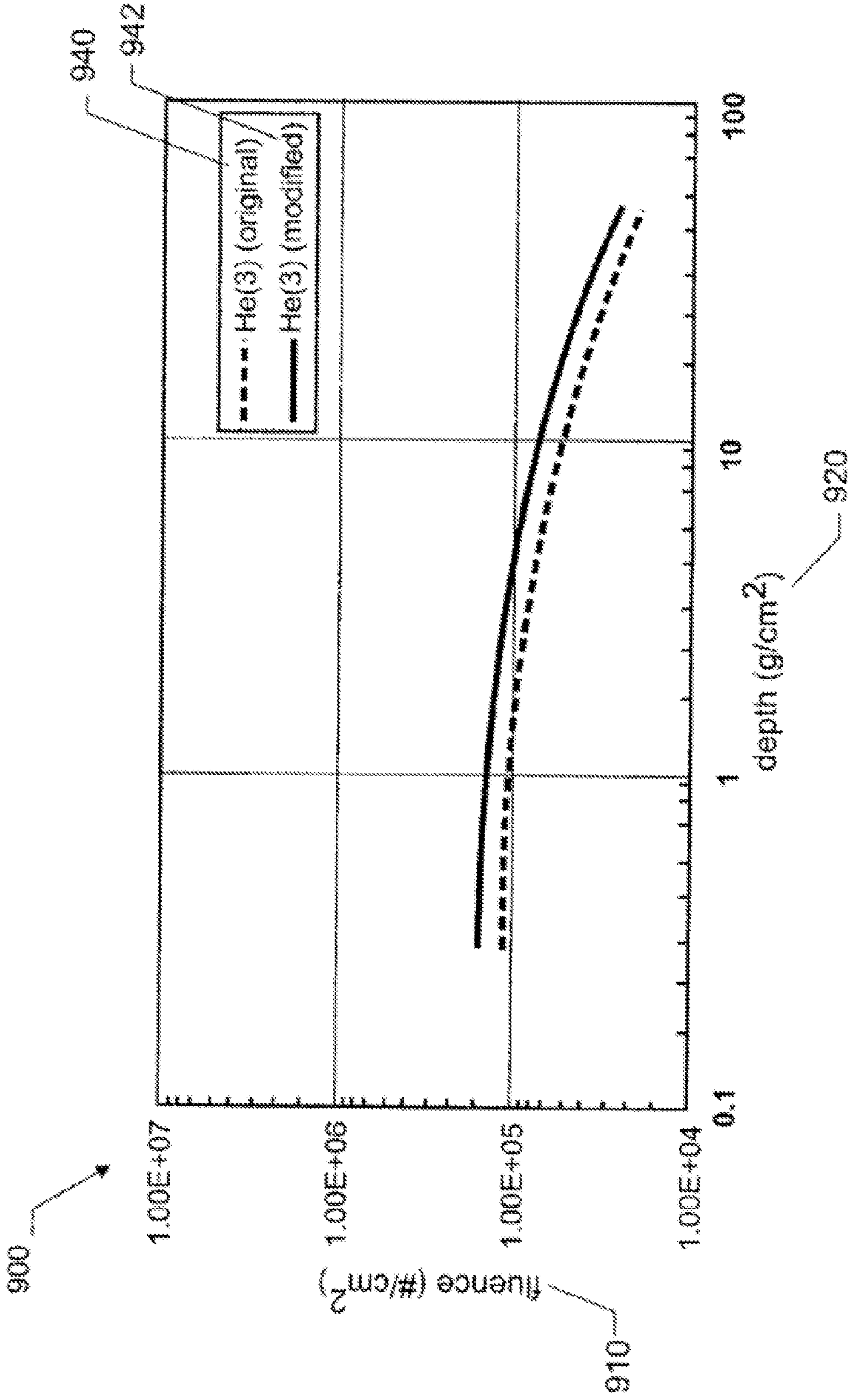
FIG. 9 is a plot illustrating the integral $He^3$ fluence versus depth in an aluminum shield using the 1995 HZETRN method and the present method for the Sep. 29, 1989 solar particle event.
Figure 10A:
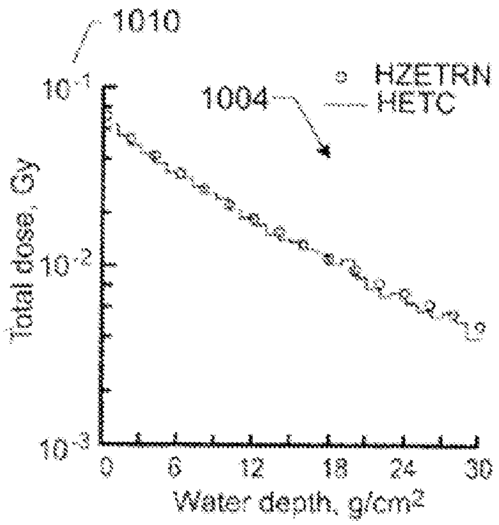
FIGS. 10*a-d* are plots illustrating the total dose and dose equivalent for the Webber benchmark SPE spectrum for aluminum and iron on water.
Figure 10B:
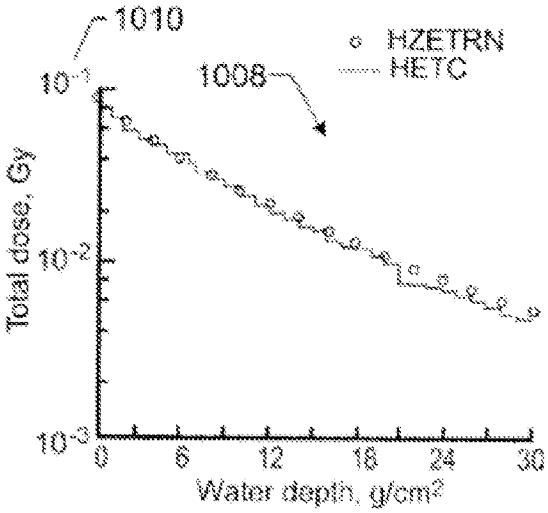
Figure 10C:
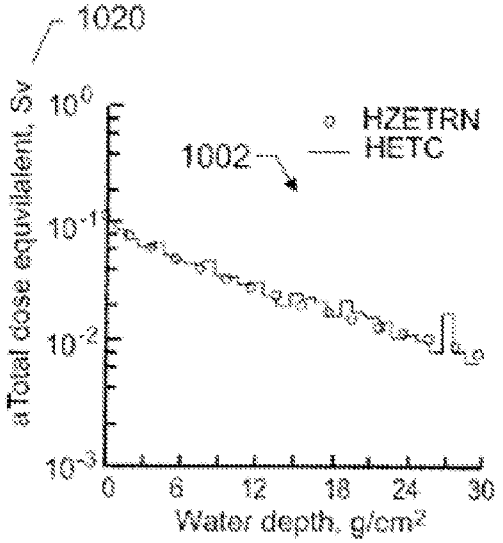
Figure 10D:
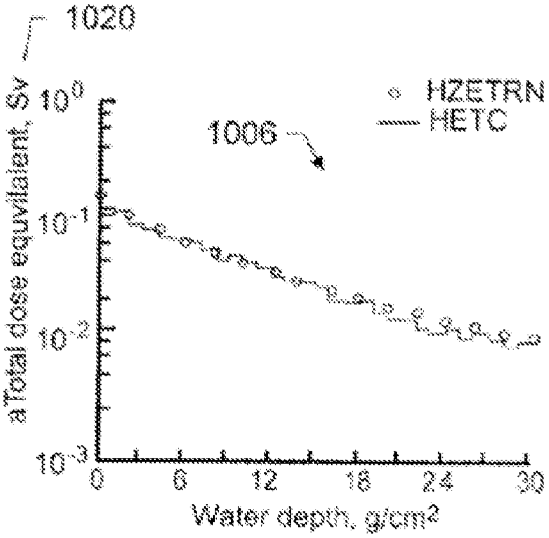

FIG. 9 is a plot 900 illustrating the integral $He^3$ fluence 910 versus depth 920 in an aluminum shield using the 1995 HZETRN method 940 and the present method 942 based on the Sep. 29, 1989 solar particle event. As can be seen in FIG. 9, the $He^3$ integral fluence 910 is increased by the factor of $v_j = 4/3$. It is expected that dose will change little as the excess of doubly charged $He^3$ contribution will largely cancel the singly charged $H^2$ and $H^3$ deficit contributions (approximately by a factor of $(4/3 - 7/6)$ times the total minor contributor's dose).

The second correction to the propagator algorithm derived above, concerns the added accuracy of the HZE propagator to $O(h^2)$ in equation (41) as opposed to the 1995 HZETRN with error term $O[(v_j - v_k)h]$. The improved HZE propagator of $O(h^2)$ allows control of the propagated error as well as reducing the local truncation error as will be demonstrated below.

Numerical Analysis of Marching Procedures

There are two variables for which numerical approximation enter into the propagator algorithms. The first is in the position variable x and the second is the residual range variable r. The coupling integrals of the Boltzmann equation involve integrals over energy that become principally integrals over residual range for the scaled flux equations, although the energy shift operator of the Boltzmann equation couples residual range shift and position drift operators along the characteristic curves of the transport solution. The principal concern is the necessary control of local truncation errors to insure that propagated error is controlled. In consideration of how errors are propagated, the error introduced locally by evaluation of $\psi(x, r_i+h)$ over the range (energy) grid with which it is defined is:

$$\psi(x+h,r_i) = \exp(-\sigma h)\psi(x,r_i+h), \tag{48}$$

whereas the local truncation error is given by:

$$\psi(x,r_i+h)=\psi_{int}(x,r_i+h)+\epsilon_i(h,r_i). \quad (49)$$

After the $k^{th}$ step from the boundary, the numerical solution is $$\psi(kh,r_i)=\exp(-\sigma h)\psi_{int}[(k-1)h,r_i+h]+\Sigma_{\lambda=0}^{k-1}\exp[-\sigma(k-\lambda)h]\epsilon_\lambda(h,r_i). \quad (50)$$

If the local truncation error is bounded above such that $\epsilon_\lambda(h,r_i)<\epsilon(h)$ for all $\lambda$, then the propagated error is bounded by:

$$\epsilon_{prp}(h)=\Sigma_{\lambda=0}^{k-1}\exp[-\sigma(k-\lambda)h]\epsilon_\lambda(h)<\epsilon(h)\Sigma_{\lambda=0}^{k-1}\exp[-\sigma(k-\lambda)h]\approx\epsilon(h)[1-\exp(-\sigma kh)]/h\sigma, \quad (51)$$

which is well behaved for all k and h if the local truncation error is bounded above by at least $O(h^2)$. The propagated error grows to a maximum of $\epsilon(h)/h\sigma$ requiring the $O(h^2)$ limitation on the local error. The asymptotic bound for deep penetration is found to be:

$$\epsilon_{prp}(h)<\epsilon(h)\exp(-\sigma h)/[1-\exp(-\sigma h)], \quad (52)$$

emphasizing again the need to control the local truncation error as $h\sigma\Rightarrow 0$. Earlier BRYNTRN and HZETRN propagator algorithms marginally met these requirements. In the reductions leading to equations (31), (32) and (41), the error terms are $O(h^2)$ when the base algorithms are obtained, but the errors associated with the numerical approximation of the remaining functions of residual range (or energy) have been left so-far unspecified and were the subjects of prior studies.

Earlier methods assumed approximate log-linear dependence of all discretized field functions of residual range that are on $O(\Delta^2)$ for galactic cosmic ray like spectra, where $\Delta$ is the order of the residual range spacing but only $O(\Delta)$ for most model solar particle events or trapped proton spectra.

The original range-grid was derived using a uniform log (E)-grid of thirty points converted to range using range-energy relations of the transport media. A previous study used a 90-point log(E)-grid as standard for evaluation of errors in the original 30-point grid and a 60-point grid. Maximum errors were first quantified to be a few percent in dose and dose equivalent at the largest depths of 150 g/cm$^2$ in air. A systematic study of grid generation and numerical interpolation was completed. It was found that a uniform log(r)-grid of 60-points gave an accurate interpolation (fraction of a percent of flux) with a fourth order Lagrange interpolation. It was desirable at that time to minimize the number of grid points as computational time is dominated by evaluation of the integral coupling terms and increases as $N^2$. It was clear that only the midrange errors were significant, so the fully uniform grid was replaced with a uniform grid over two sub-domains, allowing even greater accuracy with only 30 grid points. An excess number of points over the range of 1 g/cm$^2$, with fewer points at the lower range values, is sufficient. The errors due to the residual range grid below 1 g/cm$^2$ have no effect on the propagated error as the step size is on the order of 1 g/cm$^2$ so that this low energy part of the spectrum is deposited in the sub-range of the next step. This is facilitated by the scaled flux that approaches a constant at these lower energies [see equations (20) and (21)].

Aside from the issue of numerical interpolation and direct effects on the propagation routines, the evaluation of integrals of field quantities relates to coupling terms. Past methods used the assumed log-linear dependence and evaluated quantities analytically, arriving at computationally efficient procedures (an important feature on contemporary machines at that time). Studies of numerical integration errors were made using the 90-point solutions as a standard for which the original algorithms for integral flux resulted in errors of less than 0.5 percent. It was found that substitution of a three-point Simpson's rule reduced the integration errors by approximately an order of magnitude using midpoint values of the improved interpolation algorithm with the modified uniform log(r)-grid on two sub-domains. The reformulated propagation routines were found to have a fraction of percent error over the transport domain to 150 g/cm$^2$ depths. In every case so far studied, the approximations in equation (41) are assumed correct and attention is given to evaluation of the right hand side without reference to the original integral on the left side of equation (32).

The step size convergence within the BRYNTRN algorithm was examined using the aforementioned modifications with the 30-point converged results. The step size was varied from 1 g/cm$^2$ to 0.1 g/cm$^2$ for which dose for protons converged quickly but neutrons more slowly. The compromise step of 0.5 g/cm$^2$ is now standard in the BRYNTRN code and in the light ion propagator of HZETRN. The current version, so configured as discussed above with 30 log(r)-grid points, results in 5 percent accuracy to 150 g/cm$^2$ and is sufficient for most applications. Even so, standard practice now uses 80 such grid points assuring even improved accuracy for both GCR and SPE applications. Furthermore, the number of grid points is further adjusted to accommodate the simulation of geomagnetic cutoff effects while maintaining high numerical accuracy.

Evaluations were made of dose and dose equivalent (as given by both the International Commission on Radiological Protection ICRP 26 and ICRP 60 quality factors) in 30 cm of water behind a 20 g/cm$^2$ shield of aluminum (and alternately iron) for the approximation of the 23 Feb. 1956 spectrum (p/cm$^2$–MeV) given as a $P_0$=100 MV spectrum with $10^9$ protons/cm$^2$ above 30 MeV in the following:

$$\phi_p(0,E)=10^9\times\exp\{[239.1-p(E)]/100\}\times(2E+1876)/[200\times p(E)], \quad (53)$$

and comparing with the Monte Carlo results and more modern Monte Carlo codes using ICRP 60 quality factors. The present method was evaluated with the ICRP 26 quality factors. FIGS. 10*a-d* are plots 1002, 1004, 1006, 1008 illustrating the total dose 1010 and dose equivalent 1020 (ICRP 26) for the Webber benchmark SPE spectrum for aluminum (FIGS. 10*a-b*) and iron (FIGS. 10*c-d*) on water.

Testing has been performed with a benchmark by neglecting the integral term of equation (32) and boundary condition given by equation (53) in both the analytical solution and 1995 HZETRN code. The analytical solution is given in equation (35), neglecting the integral term and unsealing the result according to equation (24). The initial testing of the present method chosen at random from various copies revealed that the light-ion/neutron cross section routines were corrupted. These were replaced by more accurate (and uncorrupted) routines. Now, the transported flux is generally within 1 percent of the analytic solution as is the dose using Simpson's rule, but dose equivalent was found to be low by a few percent. Replacing Simpson's rule by a ten-point Gauss-Legendre quadrature brings dose equivalent to within 0.15 percent of the analytic result and Gauss-Legendre quadrature will be a permanent feature of the revised HZETRN computation method with comparisons in Table 1.

Table 1 shows the comparison of dose and dose equivalent (ICRP 60) of penetrating protons from analytical solution and the numerical solution (in parenthesis). the comparison of dose and dose equivalent is shown in Table 1 at various depths in water for the analytic benchmark of a Webber spectrum on 20 g/cm$^2$ of iron shielding 30 cm water.

TABLE 1

| Depth, cm | Dose, cGy | Dose equivalent, cSv |
|---|---|---|
| 0 | 8.405 (8.405) | 11.520 (11.505) |
| 5 | 4.083 (4.074) | 5.009 (4.979) |
| 10 | 2.321 (2.316) | 2.817 (2.800) |
| 15 | 1.417 (1.414) | 1.707 (1.696) |
| 20 | 0.909 (0.907) | 1.089 (1.082) |
| 25 | 0.604 (0.603) | 0.720 (0.716) |
| 30 | 0.412 (0.411) | 0.490 (0.487) |

Figure 11A:
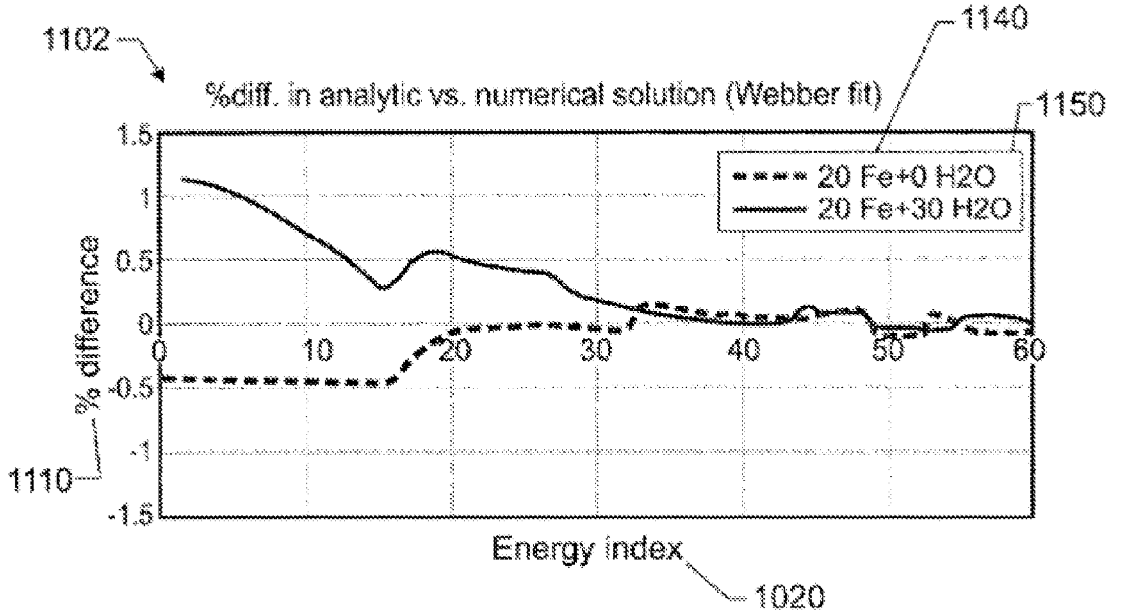
FIGS. 11*a-b* are plots showing numerical errors in proton spectra for analytic SPE and GCR benchmarks versus energy index.
Figure 11B:
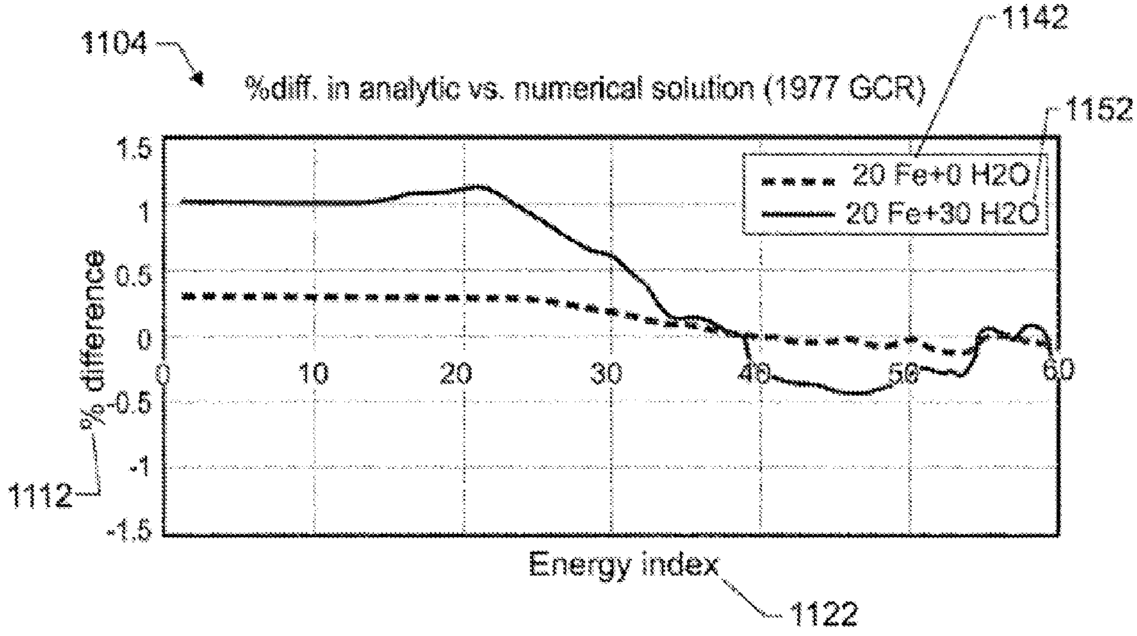

FIGS. 11*a-b* are plots 1102 and 1104 showing numerical errors 1110 and 1112 in proton spectra for analytic SPE (FIG. 11*a*) and GCR (FIG. 11*b*) benchmarks versus energy index 1020 and 1122. Indexed energies for SPE range from 0.01 to 900 MeV. Indexed energies for GCR range from 0.01 to 50,000 MeV. From the plots of FIGS. 11*a-b*, the percent differences 1110 and 1112 of the analytical proton flux and the numerically generated proton flux at the iron-shield/water interface 1140 and 1142 and at exit of the water slab 1150 and 1152 may be determined.

The results derived from the plots of FIGS. 11*a-b* provide a direct test of the basic propagator methodology, and show that the basic propagator methodology is quite accurate. In addition to allowing evaluation of the accuracy of basic transport procedures and the nuclear attenuation factors, this benchmark provides a direct test of using equation (24) for unscaling the numerical solution developed on scaling relation (44) and demonstrating the requirements for the low energy equilibrium solution of equation (15) to be accurately maintained by the approximate numerical propagation method. The benchmark solution described herein may be used for validation after porting to other platforms and differing compilers.

A similar analytic benchmark has been developed for the 1977 Solar minimum galactic cosmic ray spectrum. This benchmark demonstrates that the propagator ignoring secondary particle production and fragmentation are a fraction of percent of the corresponding analytic solution with main errors near the boundaries of the energy grid, as shown in FIGS. 11*a-b*, and most values are correct to a small fraction of 1 percent. The dose and dose equivalent of the analytic benchmark solution and numerical benchmark solution differ by less than 0.15 percent.

Benchmarking can be important in both evaluation of code accuracy as well as a provision of test cases for code verification after porting to other platforms and/or compilers.

Figure 12:
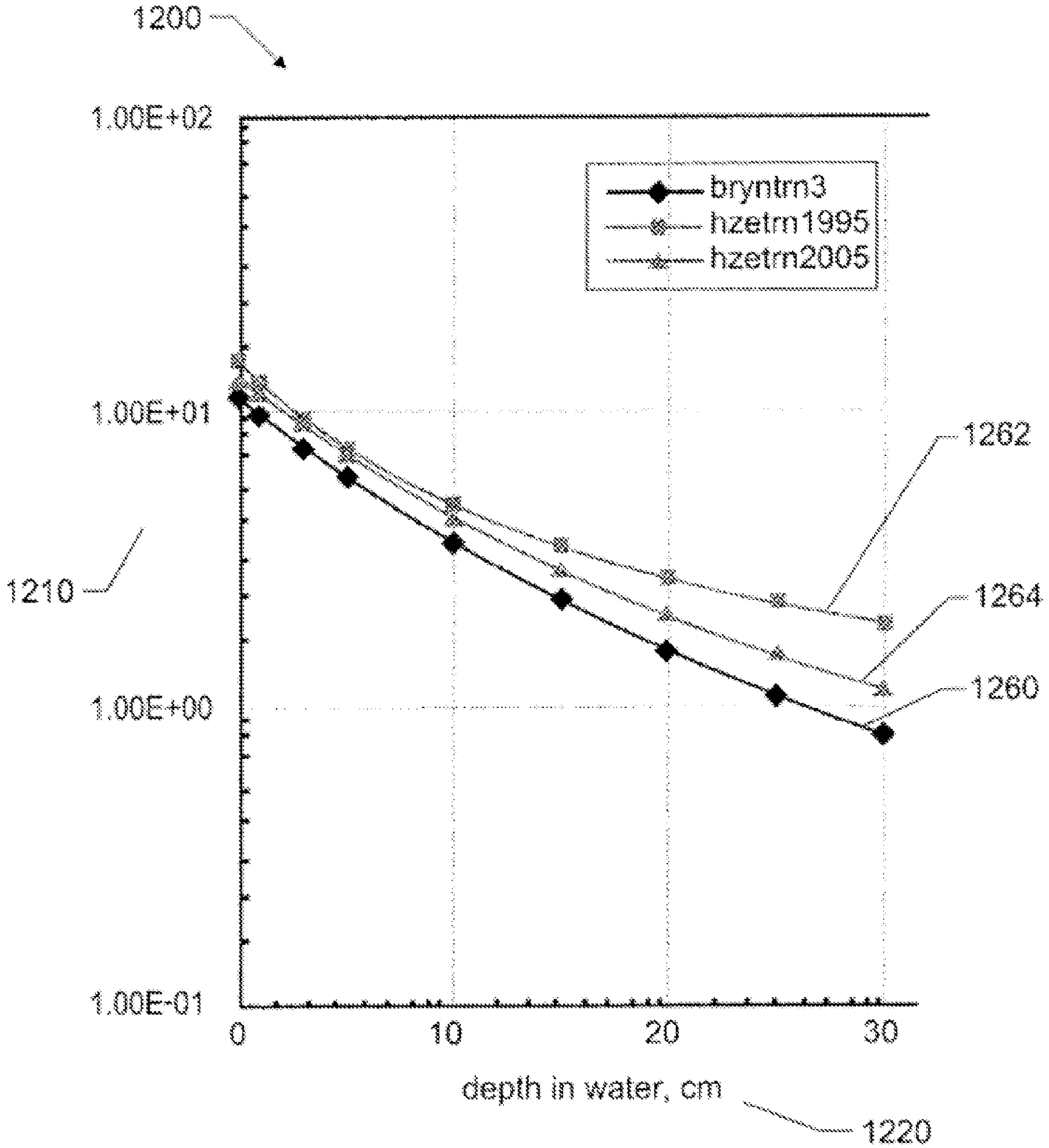
FIG. 12 is a plot illustrating a comparison of the results derived from the BRYTRN (version 3) method, the 1995 HZETRN method (including ten years of drift), and the present method.

FIG. 12 is a plot 1200 illustrating a comparison of the results derived from the BRYTRN (version 3) 1260, the 1995 HZETRN 1262 (including ten years of drift), and the present method (improved numerical procedures as developed above). The plots 1200 shown in FIG. 12 demonstrate the differences in dose equivalent 1210 (ICRP 60) shielded at different depths of water 1220 from the Webber spectrum by 20 g/cm$^2$ of iron between the different computations methods 1260, 1262 and 1264.

There are many reasons for the differences, including corruption of a nuclear reaction routine for light ions and a nuclear fragmentation database, in addition to development of improved numerical procedures. Appropriate modifications as discussed above have been made resulting in the present method having corrected nuclear routines and database. A benchmark was used based on the high-energy transport code (HETC) result using the Webber spectrum of 30-cm slab of water shielded by 20 g/cm$^2$ iron (or aluminum), as shown in FIG. 10 for the present method in comparison with dose and dose equivalent (ICRP 26 quality factor) according to HETC.

The dose and dose equivalent in water are given in Table 2 for 20 g/cm$^2$ shields of aluminum and iron herein below. Table 2 shows the dose (cGy) and dose equivalent (cSv) in a 30 cm water slab protected by aluminum or iron shield from the Webber solar particle event spectrum.

TABLE 2

| Water Depth, cm | Aluminum Shield Thickness of 20 g/cm$^2$ | | Iron Shield Thickness of 20 g/cm$^2$ | |
|---|---|---|---|---|
| x | D(x), cGy* | H(x), cSv** | D(x), cGy* | H(x), cSv** |
| 0 | 7.09 (6.83) | 11.86 (11.56) | 9.18 (8.84) | 15.39 (15.12) |
| 5 | 3.86 (3.75) | 6.06 (5.99) | 4.68 (4.54) | 7.32 (7.26) |
| 10 | 2.36 (2.28) | 3.84 (3.75) | 2.77 (2.68) | 4.45 (4.37) |
| 15 | 1.53 (1.48) | 2.53 (2.61) | 1.77 (1.71) | 2.95 (2.86) |
| 20 | 1.04 (1.00) | 1.85 (1.79) | 1.18 (1.14) | 2.07 (1.99) |
| 25 | 0.74 (0.71) | 1.40 (1.32) | 0.83 (0.78) | 1.52 (1.45) |
| 30 | 0.54 (0.51) | 1.08 (1.02) | 0.60 (0.57) | 1.16 (1.09) |

*values in parentheses are expected for TLD100

**values in parentheses are for ICRP 26 quality factors

Values for the 1977 Solar minimum GCR spectrum for the aluminum or iron shielded water are shown in Table 3. In Table 3, annual dose (cGy) and dose equivalent (cSv) in a 30 cm water slab protected by aluminum or iron shield from the 1977 Solar Minimum GCR spectrum.

TABLE 3

| Water Depth, cm | Aluminum Shield Thickness of 20 g/cm$^2$ | | Iron Shield Thickness of 20 g/cm$^2$ | |
|---|---|---|---|---|
| x | D(x), cGy* | H(x), cSv** | D(x), cGy* | H(x), cSv** |
| 0 | 20.9 (18.9) | 76.0 (66.8) | 22.0 (19.7) | 85.5 (75.7) |
| 5 | 19.0 (17.5) | 58.2 (51.7) | 19.4 (17.8) | 64.9 (57.5) |
| 10 | 18.3 (17.0) | 51.2 (45.8) | 18.6 (17.3) | 55.8 (49.8) |
| 15 | 17.7 (16.6) | 46.5 (41.9) | 18.1 (16.8) | 49.9 (44.7) |
| 20 | 17.3 (16.2) | 43.3 (41.8) | 17.6 (16.4) | 45.9 (41.3) |
| 25 | 16.9 (15.9) | 41.1 (37.2) | 17.2 (16.1) | 43.1 (39.9) |
| 30 | 16.5 (15.5) | 39.4 (35.7) | 16.8 (15.8) | 41.0 (37.1) |

*values in parentheses are expected for TLD100

**valuses in parentheses are for ICRP 26 quality factors

In Tables 2 and 3, values for dose, expected TLD100 response, and dose equivalent with ICRP 26 and ICRP 60 quality factors are given.

Additional benchmarks are provided for the two shield configurations described above (20 g/cm$^2$ of iron or aluminum shielding water) from the Monte Carlo Codes PHITS, general-purpose particle and heavy ion transport Monte Carlo code developed by the Japan Atomic Energy Agency (JAERI/JAEA), and MULASSIS, a Geant4-based multilayered shielding simulation tool, developed by the European Space Agency (ESA). The Monte Carlo results for the Webber spectrum shown in Table 4 are compared with data from the present method reproduced in Table 2. More particularly, Table 4 shows the dose (cGy) and dose equivalent (cSv) in a 30-cm water slab protected by aluminum or iron shield from the Webber solar particle event spectrum evaluated using recent Monte Carlo codes PHITS and MULASSIS (in parentheses).

TABLE 4

| Water Depth (cm) | Aluminum Shield Thickness of 20 g/cm$^2$ | | Iron Shield Thickness of 20 g/cm$^2$ | |
|---|---|---|---|---|
| x | D(x), cGy* | H(x), cSv* | D(x), cGy* | H(x), cSv* |
| 0 | 7.09 (6.82 ± 1.3%) | 10.9 (10.67 ± 3.3%) | 9.21 (8.95 ± 1.2%) | 14.6 (14.12 ± 2.8%) |
| 5 | 3.90 (3.76 ± 1.8%) | 5.95 (5.62 ± 4.8%) | 4.74 (4.54 ± 1.5%) | 7.16 (6.55 ± 3.2%) |
| 10 | 2.37 (2.27 ± 2.2%) | 3.70 (3.48 ± 7.2%) | 2.79 (2.72 ± 2.0%) | 4.26 (4.14 ± 6.5%) |
| 15 | 1.53 (1.48 ± 2.8%) | 2.44 (2.14 ± 6.3%) | 1.76 (1.73 ± 2.5%) | 2.74 (2.56 ± 6.8%) |
| 20 | 1.03 (1.02 ± 3.4%) | 1.70 (1.62 ± 8.3%) | 1.17 (1.15 ± 3.2%) | 1.87 (1.80 ± 8.9%) |
| 25 | .717 (0.72 ± 4.3%) | 1.21 (1.05 ± 7.0%) | 0.806 (0.85 ± 3.8%) | 1.32 (1.33 ± 14.5%) |
| 30 | .511 (0.51 ± 5.3%) | .843 (0.87 ± 18.3%) | 0.565 (0.60 ± 4.8%) | 0.902 (0.94 ± 9.9%) |

PHITS results for the 1977 Solar Minimum GCR spectrum are given in Table 5. More particularly, Table 5 shows the annual dose (cGy) and dose equivalent (cSv) in a 30 cm water slab protected by aluminum or iron shield from the 1977 Solar Minimum GCR spectrum evaluated using the recent Monte Carlo codes.

TABLE 5

| Water Depth, cm | Aluminum Shield Thickness of 20 g/cm$^2$ | | Iron Shield Thickness of 20 g/cm$^2$ | |
|---|---|---|---|---|
| x | D(x), cGy | H(x), cSv | D(x), cGy | H(x), cSv |
| 0 | 23.1 | 69.9 | 24.6 | 83.9 |
| 5 | 22.0 | 56.3 | 22.5 | 63.2 |
| 10 | 21.6 | 49.2 | 21.8 | 53.3 |
| 15 | 21.2 | 44.6 | 21.3 | 47.2 |
| 20 | 20.8 | 41.1 | 21.0 | 43.1 |
| 25 | 20.3 | 37.8 | 20.4 | 39.1 |
| 30 | 18.6 | 32.6 | 18.7 | 33.5 |

As can be seen, there are differences between deterministic and Monte Carlo approaches, which tend to grow near the exit of the water column and may be caused by neutron (and lesser proton) leakage on the back surface that is not present in the present method. There are other differences, especially for 1977 Solar Minimum GCR penetration problem, on the order of ten to twenty percent in dose and dose equivalent, but not exceeding operational requirements of ±30 percent.

The present invention advances Green's function methods to produce a method that is capable of being validated using high-energy ion beams, treats the off-axis scattering in the propagation of the light-ion/neutron propagator, uses marching procedures for forward produced components of the interactions, and evaluates the production source terms with broad angles with more appropriate angle dependent propagation techniques. Further, it provides a generalized method for three nonhomogeneous material regions that uses propagators with higher-order local truncation errors. This can be readily recognized by comparing equation (41) as used in 2005 HZETRN with equation (42) as used in 1995 HZETRN, which allows improved control of error propagation in the basic marching procedures (see FIG. 12, comparing line 1264 with line 1260). The process for converting to dose and dose equivalent uses improved numerical procedures based on a ten point Gauss-Legendre formulation, which was not available in 1995 HZETRN. The nuclear physics model for the absorption cross section calculations has also been revised from 1995 HZETRN. Moreover, analytical benchmarks are included for code verification and in Table 1 as a portable test. A benchmark with an early version of the Oak Ridge National Laboratory HETC Monte Carlo code is provided in the present method according to FIGS. 10*a*-*b*. Also, a benchmark using the present method is given in Tables 2 and 3. Tables 4 and 5 contain new Monte Carlo benchmarks for evaluation of Tables 2 and 3.

Figure 13:
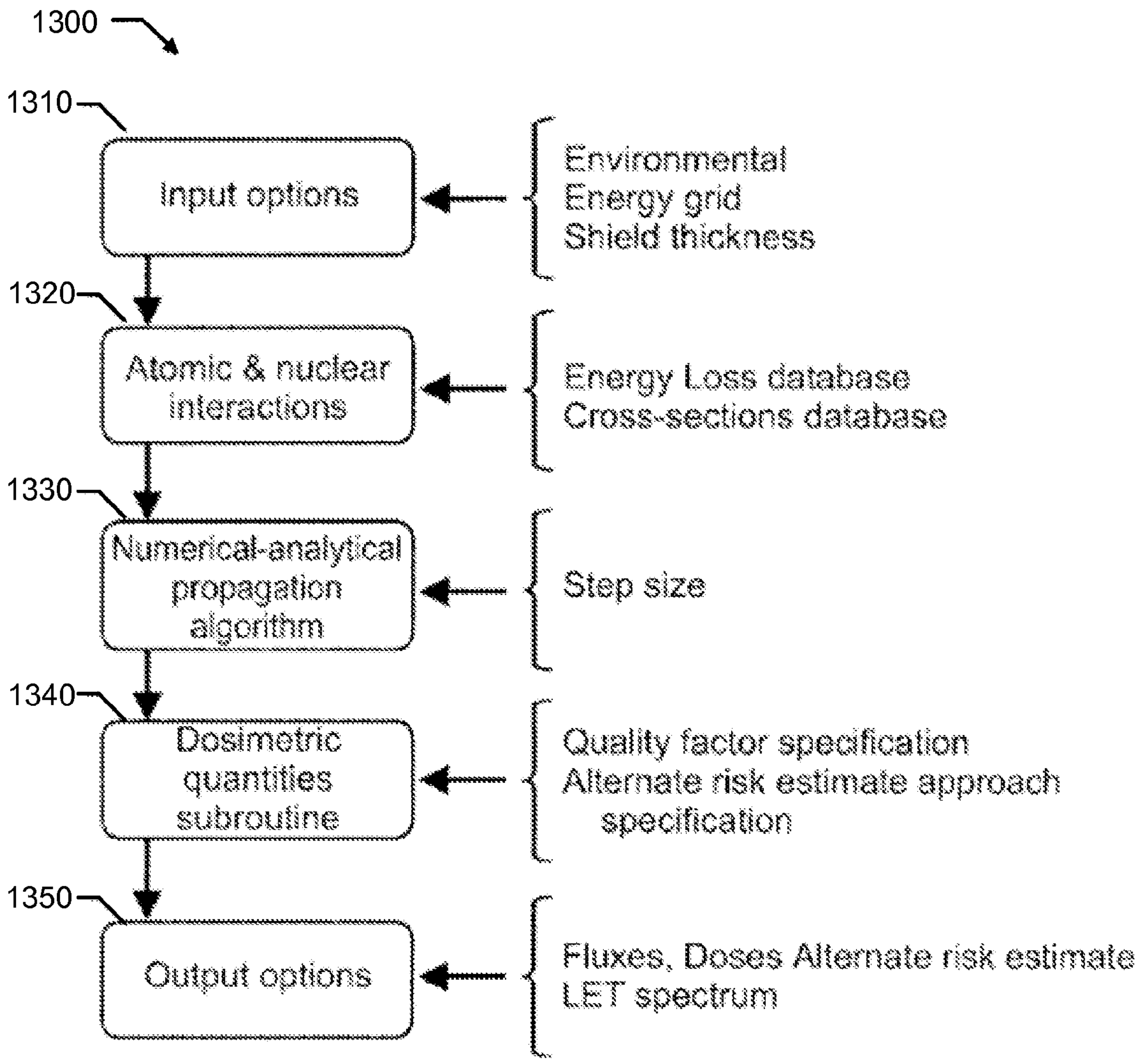
FIG. 13 is a flow chart of the present method according to an embodiment of the present invention.

FIG. 13 is a flow chart 1300 of an embodiment of the present invention. The main program and each subroutine or function module begins with a brief description of its purpose. The complete method 1300 consists of a HZETRN core, subroutines, and function modules. The method 1300 transports galactic cosmic ray (GCR) particles in free space (geomagnetic cutoffs are ignored) through a given thickness of the aluminum shield followed by a given depth of water. The HZETRN computation method 1300 includes an interface for providing input options 1310. An environmental model database is provided as an input. The array dimensions for the energy grid points and isotope fragment numbers are also entered along with the year in the solar cycle that is to be used. Finally, the depth in the aluminum shield where dosimetric quantities are to be calculated is provided as an input.

Data is provided to support the atomic and nuclear interactions 1320. For the atomic interactions, the energy, range, and stopping-power database for water and aluminum are entered. For the nuclear interactions, the absorption and fragmentation cross-section database for water and aluminum are entered. The step size for the numerical-analytical propagation algorithm 1330 may be entered. Dosimetric quantities subroutine 1340 accepts quality factor specifications and alternate risk estimate approach specifications. The Dosimetric quantities subroutine 1340 then calculates the dose and dose equivalent, which is the product of the input quality factor, Q, and the dose at a given point in human tissue. The output options 1350 include specifying the fluxes, doses, an alternate risk estimate and linear energy transfer (LET) spectra. The output of the present method 1300 may be phased in to complex geometry models for designing spacecraft radiation shields based on the output.

Figure 14:
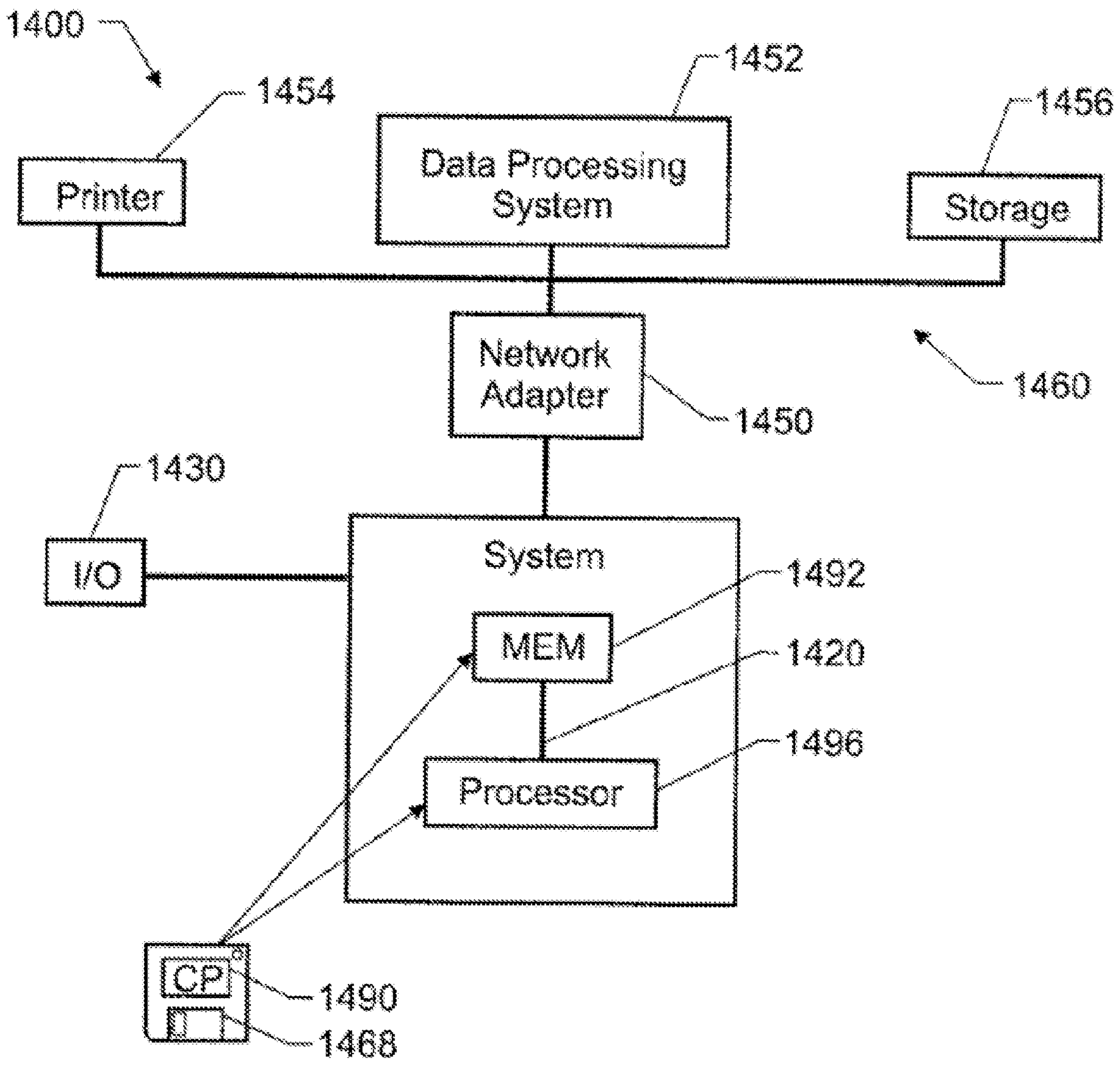
FIG. 14 illustrates a system according to an embodiment of the present invention.

FIG. 14 illustrates a system 1400 according to an embodiment of the present invention. Embodiments of the present invention may take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, embodiments of the present invention may take the form of a computer program product 1490 accessible from a computer-usable or computer-readable medium 1468 providing program code for use by or in connection with a computer or any instruction execution system.

For the purposes of this description, a computer-usable or computer readable medium 1468 can be any apparatus that can contain, store, communicate, propagate, or transport the program for use by or in connection with the instruction execution system, apparatus, or device. The medium 1468 may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A system suitable for storing and/or executing program code will include at least one processor 1496 coupled directly or indirectly to memory elements 1492 through a system bus 1420. The memory elements 1492 can include local memory employed during actual execution of the program code, bulk storage, and cache memories which provide temporary storage of at least some program code in order to reduce the number of times code must be retrieved from bulk storage during execution.

Input/output or I/O devices 1430 (including but not limited to keyboards, displays, pointing devices, etc.) can be coupled to the system either directly to the system or through intervening I/O controllers.

Network adapters 1450 may also be coupled to the system to enable the system to become coupled to other data processing systems 1452, remote printers 1454 or storage devices 1456 through intervening private or public networks 1460. Modems, cable modem and Ethernet cards are just a few of the currently available types of network adapters.

Accordingly, the computer program 1490 comprise instructions which, when read and executed by the system 1400 of FIG. 14, causes the system 1400 to perform the steps necessary to execute the steps or elements of the present invention. For example, one embodiment of the system 1400 calculates high-energy neutron/ion transport to a target of interest by performing operations that include storing data defining boundaries for a calculation of a high-energy neutron/ion transport to a target of interest; calculating the high-energy neutron/ion transport to the target of interest using numerical procedures selected to reduce local truncation error by including higher order terms and to allow absolute control of propagated error by ensuring truncation error is third order in step size, and using scaling procedures for flux coupling terms modified to improve computed results by adding a scaling factor to terms describing production of j-particles from collisions of k-particles; and providing the calculated high-energy neutron/ion transport to modeling modules to control an effective radiation dose at the target of interest.

The foregoing description of the embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed as new and desired to be secured by Letters Patent of the United States is:

1. A computer-implemented method for calculating a transport of a high-energy neutron/ion transport flux to a target of interest within a shielded region, comprising:

defining boundaries for the transport of the high-energy neutron/ion transport flux to the target of interest within the shielded region;

receiving, as input, at least one of shielding dimensions, identification of shielding materials, high-energy neutron/ion flux at the boundaries, and a spatial location for the target of interest;

calculating the transport of the high-energy neutron/ion transport flux to the target of interest via the equation $$\psi_j(x+h,r)=\exp[-\zeta_j(r,h)]\psi_j(x,r+v_jh)+\Sigma_k(v_j/v_k)\sigma_{jk}(r+v_jh/2)\psi_k[x,r+(v_j+v_k)h/2]\times\int_0^h\exp\{-\sigma_j(r+v_jh/2)x'-\sigma_k[r+(v_j+v_k)h/2)(h-x')]\})dx'=\exp[-\zeta_j(r,h)]\psi_j(x,r+v_jh)+\Sigma_k(v_j/v_k)\sigma_{jk}(r+v_j\mathrm{h}/2)\psi_k[x,r+(\mathrm{v}_j+v_k)h/2]\times[\exp\{-\sigma_j(r+v_jh/2)h\}-\exp\{-\sigma_k[r+(v_j+v_k)h/2]h\}]/\{\sigma_k[r+(v_j+v_k)h/2)]-\sigma_j(r+v_jh/2)\}+O(h^2)$$

wherein $\psi_j(x+h,r)$ and $\psi_k(x+h,r)$ are scaled fluxes for j-particles and k-particles at an end of a subinterval computational point, $\zeta_j$ and $\zeta_k$ are high-energy neutron/ion fluxes at the boundaries, x and h are spatial coordinates, r is a single residual range coordinate, $v_j$ and $v_k$ are scaling factors associated with j-particles and k-particles, respectively, and $\sigma_j$ and $\sigma_k$ are cross-sections for the j-particles and k-particles, respectively;

wherein, when calculating the high-energy neutron/ion transport flux to the target of interest, propagated error for values calculated by the computer implemented numerical method is controlled by controlling truncation error as a third order in step size;

wherein, when calculating the high-energy neutron/ion transport flux to the target of interest, the scaling factors are added to adjust for behavior associated with production of j-particles from collisions of k-particles; and wherein, when calculating the high-energy neutron/ion transport flux to the target of interest, the single residual range coordinate is introduced for all neutrons/ions in the computer implemented numerical method.

2. The method of claim 1, wherein the scaling factor is defined by a ratio $\upsilon_j/\upsilon_k$, wherein $\upsilon_j$ is $Z_j^2/A_j$, $\upsilon_k$ is $Z_k^2/A_k$, A is mass number and Z is charge number.

3. The method of claim 1, wherein the calculating high-energy neutron/ion transport flux to the target of interest further comprises calculating high-energy neutron/ion transport flux through at least one shield material.

4. The method of claim 1, wherein the calculating high-energy neutron/ion transport flux to the target of interest further comprises calculating high-energy neutron/ion transport flux to a selected tissue.

5. The method of claim 1, wherein the calculating high-energy neutron/ion transport flux to the target of interest further comprises using a uniform grid distributed over two sub-domains to provide greater accuracy with less grid points than required by the fully uniform grid.

6. The method of claim 5, wherein calculating the high-energy neutron/ion transport flux to the target of interest further comprises implementing a three-point Simpson's rule to reduce integration errors, when evaluating a number of j-particles resulting from collisions of k-particles, by using midpoint values of the improved interpolation with the uniform grid distributed over two sub-domains.

7. The method of claim 1, wherein the calculating high-energy neutron/ion transport flux to the target of interest further comprises adjusting a number of grid points to accommodate simulation of geomagnetic cutoff effects while maintaining high numerical accuracy.

8. The method of claim 1, wherein the calculating high-energy neutron/ion transport flux to the target of interest further comprises verifying accuracy of light-ion/neutron cross section routines.

9. The method of claim 1, wherein calculating dosimetric quantities from the high-energy neutron/ion transport flux to the target of interest further comprises implementing a ten-point Gauss-Legendre quadrature to improve correlation of the effective radiation dose to analytic results.

10. The method of claim 1 further comprising validating the calculated high-energy neutron/ion transport flux using measured dosimetry and dynamic anisotropic environmental models.

11. The method of claim 1, further comprising:

calculating a dose from the flux of the high energy neutron/ion transport to the target of interest.

12. The method of claim 1, wherein the scaling factor corrects for light ion propagation associated with the production of j-particles from k-particles.

13. The method of claim 12, wherein the light ion particles comprise at least one of hydrogen or helium isotopes.

14. The method of claim 1, wherein the single residual range coordinate comprises mapping, at low energies, for the high-energy neutron/ion transport flux to the target of interest.

15. The method of claim 1, wherein calculating the transport of the high-energy neutron/ion transport flux to the target of interest is accomplished in steps from the boundaries to the target of interest.

16. The method of claim 4, wherein the tissue is a tumor.

17. The method of claim 10, wherein validating the calculated high-energy neutron/ion transport flux using measured dosimetry and dynamic anisotropic environmental models occurs with respect to a predetermined vehicle design.

18. A device configured to calculate a transport of a high-energy neutron/ion transport flux to a target of interest within a shielded region, comprising:

memory for storing data defining boundaries for the transport of the high-energy neutron/ion transport flux to the target of interest within the shielded region;

an input device for receiving, as input, at least one of shielding dimensions, identification of shielding materials, high-energy neutron/ion flux at the boundaries, and a spatial location for the target of interest; and a processor, coupled to the memory, for calculating the transport of the high-energy neutron/ion transport flux to the target of interest interest via the equation $$\psi_j(x+h,r)=\exp[-\zeta_j(r,h)]\psi_j(x,r+v_jh)+\Sigma_k(v_j/v_k)\sigma_{jk}(r+v_jh/2)\psi_k[x,r+(v_j+v_k)h/2]\times\int_0^h\exp\{-\sigma_j(r+v_jh/2)x'-\sigma_k[r+(v_j+v_k)h/2)(h-x')]\})dx'=\exp[-\zeta_j(r,h)]\psi_j(x,r+v_jh)+\Sigma_k(v_j/v_k)\sigma_{jk}(r+v_jh/2)\psi_k[x,r+(v_j+v_k)h/2]\times[\exp\{-\sigma_j(r+v_jh/2)h\}-\exp\{-\sigma_k[r+(v_j+v_k)h/2]h\}]/\{\sigma_k[r+(v_j+v_k)h/2)]-\sigma_j(r+v_jh/2)\}+O(h^2)$$

wherein $\psi_j$(x+h,r) and $\psi_k$(x+h,r) are scaled fluxes for j-particles and k-particles at an end of a subinterval computational point, $\zeta_j$ and $\zeta_k$ are high-energy neutron/ion fluxes at the boundaries, x and h are spatial coordinates, r is a single residual range coordinate, $v_j$ and $v_k$ are scaling factors associated with j-particles and k-particles, respectively, and $\sigma_j$ and $\sigma_k$ are cross-sections for the j-particles and k-particles, respectively, wherein, when calculating the high-energy neutron/ion transport flux to the target of interest, propagated error for values calculated by the corn cuter implemented numerical method is controlled by controlling truncation error as a third order in step size, wherein, when calculating the high-energy neutron/ion transport flux to the target of interest, the scaling factor are added to adjust for behavior associated with production of j-particles from collisions of k-particles, and wherein, when calculating the high-energy neutron/ion transport flux to the target of interest, the single residual range coordinate is introduced for all neutrons/ions in the computer implemented numerical method.

* * * * *